(12) United States Patent
Hsieh et al.

(10) Patent No.: US 8,743,485 B2
(45) Date of Patent: Jun. 3, 2014

(54) WIDE-VIEWING-ANGLE IMAGING LENS ASSEMBLY

(75) Inventors: Dung Yi Hsieh, Taichung (TW); Hsiang Chi Tang, Taichung (TW); Tsung Han Tsai, Taichung (TW)

(73) Assignee: Largen Precision Co., Ltd., Taichung (TW)

( * ) Notice: Subject to any disclaimer, the term of this patent is extended or adjusted under 35 U.S.C. 154(b) by 890 days.

(21) Appl. No.: 12/912,460

(22) Filed: Oct. 26, 2010

(65) Prior Publication Data

US 2011/0316969 A1 Dec. 29, 2011

(30) Foreign Application Priority Data

Jun. 28, 2010 (TW) .............................. 099121007 A

(51) Int. Cl.
*G02B 9/60* (2006.01)
*G02B 9/62* (2006.01)

(52) U.S. Cl.
CPC ... *G02B 9/60* (2013.01); *G02B 9/62* (2013.01)
USPC .......................................... 359/770; 359/793

(58) Field of Classification Search
CPC ............... G02B 9/60; G02B 9/62; G02B 9/64
USPC .................................................. 359/755–795
See application file for complete search history.

(56) References Cited

U.S. PATENT DOCUMENTS

| | | | |
|---|---|---|---|
| 4,403,837 A * | 9/1983 | Nakahashi | ................ 359/770 |
| 4,493,537 A | 1/1985 | Nakahashi | |
| 5,087,989 A | 2/1992 | Igarashi | |
| 5,198,931 A | 3/1993 | Igarashi | |
| 7,446,955 B1 | 11/2008 | Noda et al. | |
| 7,746,572 B2 | 6/2010 | Asami | |
| 2011/0096413 A1* | 4/2011 | Lo et al. | ................ 359/717 |

* cited by examiner

*Primary Examiner* — Darryl J Collins
(74) *Attorney, Agent, or Firm* — Morris, Manning & Martin, LLP; Tim Tingkang Xia, Esq.

(57) ABSTRACT

The present invention provides a wide-viewing-angle imaging lens assembly comprising, in order from an object side to an image side: a front lens group, a stop, and a rear lens group. The front lens group comprises, in order from the object side to the image side: a first lens element with negative refractive power having a concave image-side surface and a second lens element. The rear lens group comprises, in order from the object side to the image side: a third lens element with positive refractive power having a concave object-side surface and a convex image-side surface, a fourth lens element with positive refractive power having a convex object-side surface and a convex image-side surface, and a fifth lens element with negative refractive power having a concave object-side surface. Such an arrangement of optical elements can effectively enlarge the field of view of the wide-viewing-angle imaging lens assembly, reduce the sensitivity of the optical system, and obtain good image quality.

20 Claims, 25 Drawing Sheets

| TABLE 1 | | | | | | |
|---|---|---|---|---|---|---|
| (Embodiment 1) | | | | | | |
| $f = 2.56$ mm, Fno = 2.08, HFOV = 79.7 deg. | | | | | | |
| Surface # | | Curvature Radius | Thickness | Material | Index | Abbe # | Focal length |
| 0 | Object | Plano | Infinity | | | | |
| 1 | Lens 1 | 15.567100 | 0.800 | Glass | 1.697 | 55.5 | -4.38 |
| 2 | | 2.500000 | 1.052 | | | | |
| 3 | Lens 2 | 19.627200 (ASP) | 0.591 | Plastic | 1.632 | 23.4 | 12.86 |
| 4 | | -13.711200 (ASP) | 0.554 | | | | |
| 5 | Ape. Stop | Plano | 0.300 | | | | |
| 6 | Lens 3 | -3.687200 (ASP) | 1.753 | Plastic | 1.544 | 55.9 | 4.34 |
| 7 | | -1.679910 (ASP) | 0.080 | | | | |
| 8 | Lens 4 | 6.790700 | 2.608 | Glass | 1.729 | 54.7 | 3.45 |
| 9 | | -3.346700 | 0.010 | Cement | | | |
| 10 | Lens 5 | -3.346700 | 0.450 | Glass | 1.847 | 23.8 | -3.95 |
| 11 | | Plano | 1.200 | | | | |
| 12 | IR-filter | Plano | 0.200 | Glass | 1.517 | 64.2 | - |
| 13 | | Plano | 0.500 | | | | |
| 14 | Cover-glass | Plano | 0.400 | Glass | 1.517 | 64.2 | - |
| 15 | | Plano | 0.524 | | | | |
| 16 | Image | Plano | - | | | | |
| Reference wavelength is d-line(587.6 nm) | | | | | | | |

Fig.7

| TABLE 2 | | | | |
|---|---|---|---|---|
| Aspheric Coefficients | | | | |
| Surface # | 3 | 4 | 6 | 7 |
| k = | 6.57057E+01 | -2.54462E+02 | 1.15302E+01 | 9.95393E-03 |
| A4 = | 7.83027E-03 | 1.08417E-02 | -1.95353E-02 | 5.30448E-03 |
| A6 = | 1.41269E-03 | -4.23536E-04 | 2.22816E-04 | 4.92404E-04 |
| A8 = | -2.68970E-04 | -7.72354E-04 | -2.11498E-03 | -5.37736E-04 |
| A10= | -2.84749E-05 | 9.85838E-05 | -7.69827E-03 | 2.95189E-04 |

Fig.8

| TABLE 3 | | | | | | |
|---|---|---|---|---|---|---|
| (Embodiment 2) | | | | | | |
| f = 2.45 mm, Fno = 2.40, HFOV= 80.9 deg. | | | | | | |
| Surface # | | Curvature Radius | Thickness | Material | Index | Abbe # | Focal length |
| 0 | Object | Plano | Infinity | | | | |
| 1 | Lens 1 | 7.674900 (ASP) | 0.500 | Plastic | 1.544 | 55.9 | -4.03 |
| 2 | | 1.666670 (ASP) | 1.538 | | | | |
| 3 | Lens 2 | 7.321600 (ASP) | 0.771 | Plastic | 1.650 | 21.4 | 13.85 |
| 4 | | 37.641300 (ASP) | 0.635 | | | | |
| 5 | Ape. Stop | Plano | 0.300 | | | | |
| 6 | Lens 3 | -6.235800 (ASP) | 2.158 | Plastic | 1.544 | 55.9 | 4.47 |
| 7 | | -1.964330 (ASP) | 0.080 | | | | |
| 8 | Lens 4 | 6.255100 | 2.869 | Glass | 1.729 | 54.7 | 3.64 |
| 9 | | -3.721100 | 0.010 | Cement | | | |
| 10 | Lens 5 | -3.721100 | 0.450 | Glass | 1.847 | 23.8 | -3.75 |
| 11 | | 22.883300 | 1.500 | | | | |
| 12 | IR-filter | Plano | 0.600 | Glass | 1.517 | 64.2 | - |
| 13 | | Plano | 0.614 | | | | |
| 14 | Image | Plano | - | | | | |
| Reference wavelength is d-line(587.6 nm) | | | | | | | |

Fig.9

| TABLE 4 | | | | | | |
|---|---|---|---|---|---|---|
| Aspheric Coefficients | | | | | | |
| Surface # | 1 | 2 | 3 | 4 | 6 | 7 |
| k = | -1.15358E+01 | -7.45467E-01 | -1.17082E+01 | -1.00000E+00 | 8.89290E+00 | 2.21068E-02 |
| A4 = | -1.29621E-03 | 6.31181E-03 | 2.77303E-03 | -4.52578E-03 | -3.15311E-02 | 4.10635E-03 |
| A6 = | 7.26207E-05 | 1.49307E-03 | -1.95292E-03 | -1.13017E-03 | 6.91008E-03 | 8.45755E-04 |
| A8 = | | 3.30365E-04 | -9.90643E-04 | -1.03950E-03 | -1.71405E-02 | -3.10881E-04 |
| A10= | | -1.57947E-04 | 1.42880E-04 | 1.97845E-04 | -4.61922E-03 | 9.19511E-05 |

Fig.10

| TABLE 5 | | | | | | | |
|---|---|---|---|---|---|---|---|
| (Embodiment 3) | | | | | | | |
| f = 2.81 mm, Fno = 2.05, HFOV= 70.4 deg. | | | | | | | |
| Surface # | | Curvature Radius | Thickness | Material | Index | Abbe # | Focal length |
| 0 | Object | Plano | Infinity | | | | |
| 1 | Lens 1 | 19.001600 | 0.800 | Glass | 1.697 | 55.5 | -5.72 |
| 2 | | 3.236400 | 3.283 | | | | |
| 3 | Lens 2 | -19.068300 (ASP) | 2.957 | Plastic | 1.633 | 23.4 | 28.30 |
| 4 | | -9.790300 (ASP) | 0.446 | | | | |
| 5 | Lens 3 | -6.147800 (ASP) | 3.000 | Plastic | 1.544 | 55.9 | 43.87 |
| 6 | | -5.729400 (ASP) | 0.070 | | | | |
| 7 | Ape. Stop | Plano | 0.197 | | | | |
| 8 | Lens 4 | 6.693300 | 3.470 | Glass | 1.729 | 54.7 | 3.46 |
| 9 | | -3.169400 | 0.010 | Cement | | | |
| 10 | Lens 5 | -3.168700 | 0.500 | Glass | 1.847 | 23.8 | -5.99 |
| 11 | | -9.065600 | 4.000 | | | | |
| 12 | IR-filter | Plano | 0.300 | Glass | 1.517 | 64.2 | - |
| 13 | | Plano | 1.477 | | | | |
| 14 | Image | Plano | - | | | | |
| Reference wavelength is d-line(587.6 nm) | | | | | | | |

Fig.11

| TABLE 6 | | | | |
|---|---|---|---|---|
| Aspheric Coefficients | | | | |
| Surface # | 3 | 4 | 5 | 6 |
| k  = | -2.00000E+02 | 1.21309E+01 | -2.70531E+00 | 1.10681E-02 |
| A4 = | -7.81326E-03 | -3.76494E-03 | -2.21183E-03 | 1.67458E-03 |
| A6 = | 1.49121E-05 | 2.67554E-04 | -1.94948E-04 | 3.52207E-05 |
| A8 = | -4.97560E-05 | 1.66864E-05 | 2.27159E-04 | -1.91870E-07 |
| A10= | 5.00409E-06 | 1.78827E-05 | -6.06395E-06 | 1.26151E-07 |

Fig.12

| TABLE 7 | | | | | | | |
|---|---|---|---|---|---|---|---|
| (Embodiment 4) | | | | | | | |
| f = 2.52 mm, Fno = 2.20, HFOV = 81.8 deg. | | | | | | | |
| Surface # | | Curvature Radius | Thickness | Material | Index | Abbe # | Focal length |
| 0 | Object | Plano | Infinity | | | | |
| 1 | Lens 1 | 31.696500 | 1.452 | Glass | 1.729 | 54.7 | -4.19 |
| 2 | | 2.731800 | 1.962 | | | | |
| 3 | Lens 2 | 8.505000 (ASP) | 2.738 | Plastic | 1.632 | 23.4 | 16.24 |
| 4 | | 43.478300 (ASP) | 0.278 | | | | |
| 5 | Ape. Stop | Plano | 0.300 | | | | |
| 6 | Lens 3 | -4.999700 (ASP) | 1.258 | Plastic | 1.544 | 55.9 | 11.40 |
| 7 | | -3.014300 (ASP) | 0.140 | | | | |
| 8 | Lens 4 | 2.762520 (ASP) | 2.551 | Plastic | 1.544 | 55.9 | 2.59 |
| 9 | | -1.941220 (ASP) | 0.100 | | | | |
| 10 | Lens 5 | -2.213080 (ASP) | 1.475 | Plastic | 1.632 | 23.4 | -2.89 |
| 11 | | 13.106200 (ASP) | 1.000 | | | | |
| 12 | IR-filter | Plano | 0.600 | Glass | 1.517 | 64.2 | - |
| 13 | | Plano | 0.781 | | | | |
| 14 | Image | Plano | - | | | | |
| Reference wavelength is d-line(587.6 nm) | | | | | | | |

Fig.13

| TABLE 8 | | | | |
|---|---|---|---|---|
| Aspheric Coefficients | | | | |
| Surface # | 3 | 4 | 6 | 7 |
| k    = | -1.00000E+00 | -1.00000E+00 | -1.00000E+00 | 1.27232E+00 |
| A4 = | 9.86371E-05 | 3.58677E-02 | 4.29640E-02 | 5.11929E-04 |
| A6 = | 3.96861E-04 | -1.94867E-03 | -1.22363E-02 | -3.64356E-03 |
| A8 = | -3.55639E-05 | 6.13607E-03 | 3.62987E-03 | 1.11419E-03 |
| A10= | -1.29393E-05 | -1.09020E-03 | -7.41709E-04 | -1.88417E-04 |
| Surface # | 8 | 9 | 10 | 11 |
| k    = | -1.72556E+00 | -6.22100E-01 | -3.00427E-01 | -1.00000E+00 |
| A4 = | -4.92947E-03 | 2.35492E-02 | -5.04463E-03 | -1.76963E-02 |
| A6 = | 5.46960E-04 | -2.92512E-03 | 4.43137E-03 | 3.91361E-03 |
| A8 = | -8.92644E-05 | 2.54994E-04 | -1.80350E-04 | -2.94451E-04 |
| A10= | -3.91815E-05 | 1.94783E-05 | 5.07307E-05 | 4.67701E-06 |

Fig.14

| TABLE 9 | | | | | | | |
|---|---|---|---|---|---|---|---|
| (Embodiment 5) | | | | | | | |
| f = 2.36 mm, Fno = 2.40, HFOV = 82.6 deg. | | | | | | | |
| Surface # | | Curvature Radius | Thickness | Material | Index | Abbe # | Focal length |
| 0 | Object | Plano | Infinity | | | | |
| 1 | Lens 1 | 9.527900 | 1.131 | Glass | 1.772 | 49.6 | -3.78 |
| 2 | | 2.119500 | 1.491 | | | | |
| 3 | Lens 2 | 13.550100 (ASP) | 1.980 | Plastic | 1.632 | 23.4 | -12.70 |
| 4 | | 4.756100 (ASP) | 0.230 | | | | |
| 5 | Ape. Stop | Plano | 0.086 | | | | |
| 6 | Lens 3 | -22.831100 (ASP) | 1.879 | Plastic | 1.544 | 55.9 | 3.47 |
| 7 | | -1.795120 (ASP) | 0.900 | | | | |
| 8 | Lens 4 | 6.793500 | 2.284 | Glass | 1.729 | 54.7 | 3.06 |
| 9 | | -2.857100 | 0.010 | Cement | | | |
| 10 | Lens 5 | -2.857100 | 0.450 | Glass | 1.847 | 23.8 | -3.64 |
| 11 | | -41.493800 | 2.000 | | | | |
| 12 | IR-filter | Plano | 0.600 | Glass | 1.517 | 64.2 | - |
| 13 | | Plano | 0.794 | | | | |
| 14 | Image | Plano | - | | | | |
| Reference wavelength is d-line(587.6 nm) | | | | | | | |

Fig.15

| TABLE 10 | | | | |
|---|---|---|---|---|
| Aspheric Coefficients | | | | |
| Surface # | 3 | 4 | 6 | 7 |
| k  = | -1.00000E+00 | -1.00000E+00 | -1.00000E+00 | 1.09192E-01 |
| A4 = | 1.73102E-03 | 3.53132E-02 | -1.43729E-02 | 2.16449E-03 |
| A6 = | 2.64288E-04 | 1.52216E-02 | -1.05215E-02 | 1.46768E-03 |
| A8 = | -6.59942E-06 | -5.72554E-03 | 8.58861E-03 | -6.21039E-04 |
| A10= | -7.43183E-06 | 1.35632E-02 | -7.87262E-03 | 1.38774E-04 |

Fig.16

| TABLE 11 | | | | | | |
|---|---|---|---|---|---|---|
| (Embodiment 6) | | | | | | |
| f = 2.53 mm, Fno = 2.10, HFOV= 79.7 deg. | | | | | | |
| Surface # | | Curvature Radius | Thickness | Material | Index | Abbe # | Focal length |
| 0 | Object | Plano | Infinity | | | | |
| 1 | Lens 1 | 10.191600 | 1.177 | Glass | 1.772 | 49.6 | -3.71 |
| 2 | | 2.122200 | 1.557 | | | | |
| 3 | Lens 2 | 13.900100 (ASP) | 2.180 | Plastic | 1.632 | 23.4 | 50.92 |
| 4 | | 22.982200 (ASP) | 0.083 | | | | |
| 5 | Ape. Stop | Plano | 0.159 | | | | |
| 6 | Lens 3 | -8.322600 (ASP) | 2.137 | Plastic | 1.544 | 55.9 | 4.85 |
| 7 | | -2.184320 (ASP) | 0.080 | | | | |
| 8 | Lens 4 | 6.757800 | 3.144 | Glass | 1.729 | 54.7 | 3.38 |
| 9 | | -3.116700 | 0.010 | Cement | | | |
| 10 | Lens 5 | -3.116700 | 0.450 | Glass | 1.847 | 23.8 | -3.98 |
| 11 | | -44.696200 | 2.000 | | | | |
| 12 | IR-filter | Plano | 0.600 | Glass | 1.517 | 64.2 | - |
| 13 | | Plano | 0.924 | | | | |
| 14 | Image | Plano | - | | | | |
| Reference wavelength is d-line(587.6 nm) | | | | | | | |

Fig.17

| TABLE 12 | | | | |
|---|---|---|---|---|
| Aspheric Coefficients | | | | |
| Surface # | 3 | 4 | 6 | 7 |
| k = | 9.38732E+00 | 1.38779E+02 | 4.91144E+01 | 2.09658E-01 |
| A4 = | 2.99366E-04 | 1.00507E-02 | -2.90060E-03 | 6.70974E-04 |
| A6 = | -1.21200E-03 | -8.30267E-03 | -4.78455E-03 | 2.65099E-03 |
| A8 = | 2.75112E-04 | 1.16492E-02 | 7.00159E-03 | -9.16401E-04 |
| A10= | -3.77009E-05 | -7.08779E-03 | -4.60299E-03 | 1.56858E-04 |

Fig.18

| TABLE 13 | | | | | | |
|---|---|---|---|---|---|---|
| | Embodiment 1 | Embodiment 2 | Embodiment 3 | Embodiment 4 | Embodiment 5 | Embodiment 6 |
| f | 2.56 | 2.45 | 2.81 | 2.52 | 2.36 | 2.53 |
| Fno | 2.08 | 2.40 | 2.05 | 2.20 | 2.40 | 2.10 |
| HFOV | 79.7 | 80.9 | 70.4 | 81.8 | 82.6 | 79.7 |
| V1-V2 | 32.1 | 34.5 | 32.1 | 31.3 | 26.2 | 26.2 |
| f/f1 | -0.58 | -0.61 | -0.49 | -0.60 | -0.62 | -0.68 |
| f/f4 | 0.74 | 0.67 | 0.81 | 0.97 | 0.77 | 0.75 |
| |f1/f2| | 0.34 | 0.29 | 0.20 | 0.26 | 0.30 | 0.07 |
| R6/R5 | 0.46 | 0.32 | 0.93 | 0.60 | 0.08 | 0.26 |
| R7/R8 | -2.03 | -1.68 | -2.11 | -1.42 | -2.38 | -2.17 |
| R9/R10 | 0.00 | -0.16 | 0.35 | -0.17 | 0.07 | 0.07 |
| (R1+R2)/(R1-R2) | 1.38 | 1.55 | 1.41 | 1.19 | 1.57 | 1.53 |
| T23/f | 0.33 | 0.38 | 0.16 | 0.23 | 0.13 | 0.10 |
| ImgH/f | 1.24 | 1.31 | 1.00 | 1.13 | 1.31 | 1.25 |
| SL/TTL | 0.72 | 0.71 | 0.48 | 0.55 | 0.65 | 0.65 |
| TTL/ImgH | 3.41 | 3.69 | 7.29 | 5.06 | 4.40 | 4.51 |

Fig.19

WIDE-VIEWING-ANGLE IMAGING LENS ASSEMBLY

CROSS-REFERENCE TO RELATED APPLICATIONS

This non-provisional application claims priority under 35 U.S.C. §119(a) on Patent Application No(s). 099121007 filed in Taiwan, R.O.C. on Jun. 28, 2010, the entire contents of which are hereby incorporated by reference.

BACKGROUND OF THE INVENTION

1. Field of the Invention

The present invention relates to a wide-viewing-angle imaging lens assembly, and more particularly, to a wide-viewing-angle imaging lens assembly that is compact in size with a large angle of view.

2. Description of the Prior Art

In recent years, optical imaging lenses have been used in a wider range of products, and in particular, they are used in the following products for example: mobile phone cameras, webcams, vehicle cameras, security surveillance cameras and electronic game devices. The sensor of a general imaging lens is none other than CCD (charge coupled device) or CMOS device (Complementary Metal Oxide Semiconductor device). As advances in semiconductor manufacturing technology have allowed the pixel size of sensors to be reduced, and the resolution of compact imaging lenses has gradually increased, there is an increasing demand for compact imaging lenses featuring better image quality.

Imaging lenses used in vehicle cameras, security surveillance cameras or electronic game devices typically require a larger field of view, to capture an image of a larger area at one time. A conventional imaging lens assembly with a large field of view generally comprises a front lens group with negative refractive power and a rear lens group with positive refractive power; such an arrangement forms a so-called inverse telephoto lens which features a wide field of view. One example is shown in U.S. Pat. No. 7,446,955, which has disclosed a lens assembly comprising four lens elements wherein the front lens group has negative refractive power and the rear lens group has positive refractive power. Such an arrangement of lens elements allows a lens assembly to have a larger field of view; however, with the rear lens group having only one lens element, aberrations of the system cannot be favorably corrected. Moreover, vehicles equipped with backup cameras have become more and more common, and there is a trend toward high-resolution, wide-angle lenses for backup cameras. As a result, there remains a need to provide an imaging lens assembly which has a wide field of view, high image quality, and a reduced total track length.

SUMMARY OF THE INVENTION

The present invention provides a wide-viewing-angle imaging lens assembly comprising, in order from an object side to an image side: a front lens group, a stop, and a rear lens group. The front lens group comprises, in order from the object side to the image side: a first lens element with negative refractive power having a concave image-side surface and a second lens element. The rear lens group comprises, in order from the object side to the image side: a third lens element with positive refractive power having a concave object-side surface and a convex image-side surface, a fourth lens element with positive refractive power having a convex object-side surface and a convex image-side surface, and a fifth lens element with negative refractive power having a concave object-side surface. In this wide-viewing-angle imaging lens assembly, the lens element with refractive power which is closest to an object is the first lens element, a focal length of the assembly is f, a focal length of the first lens element is f1, a focal length of the second lens element is f2, a focal length of the fourth lens element is f4, a distance on an optical axis between the second lens element and the third lens element is T23, a radius of curvature of the object-side surface of the fourth lens element is R7, a radius of curvature of the image-side surface of the fourth lens element is R8, and they satisfy the following relations: $-0.78<f/f1<-0.25$; $0.50<f/f4<1.00$; $|f1/f2|<0.60$; $0.02<T23/f<0.68$; and $-3.50<R7/R8<-0.50$.

Moreover, the present invention provides a wide-viewing-angle imaging lens assembly comprising, in order from an object side to an image side: a first lens element with negative refractive power having a convex object-side surface and a concave image-side surface, a second lens element, a third lens element with positive refractive power having a convex image-side surface, a fourth lens element with positive refractive power having a convex object-side surface and a convex image-side surface, and a fifth lens element with negative refractive power having a concave object-side surface. In this wide-viewing-angle imaging lens assembly, there are five lens elements with refractive power. The assembly is further provided with an electronic sensor disposed at an image plane for image formation of an object, a focal length of the assembly is f, a focal length of the first lens element is f1, a focal length of the second lens element is f2, a distance on an optical axis between the second lens element and the third lens element is T23, half of a diagonal length of an effective pixel area of the electronic sensor is ImgH, and they satisfy the following relations: $-0.78<f/f1<-0.25$; $|f1/f2|<0.60$; $0.02<T23/f<0.68$; and $0.93<ImgH/f<2.30$.

Furthermore, the present invention provides a wide-viewing-angle imaging lens assembly comprising, in order from an object side to an image side: a first lens element with negative refractive power having a convex object-side surface and a concave image-side surface, a second lens element, a third lens element with positive refractive power having a convex image-side surface, a fourth lens element with positive refractive power having a convex object-side surface and a convex image-side surface, and a fifth lens element with negative refractive power having a concave object-side surface. In this wide-viewing-angle imaging lens assembly, a focal length of the first lens element is f1, a focal length of the second lens element is f2, and they satisfy the following relation: $|f1/f2|<0.60$.

Such arrangements of optical elements can effectively enlarge the field of view of the wide-viewing-angle imaging lens assembly, reduce the sensitivity of the optical system, and obtain good image quality.

In a wide-viewing-angle imaging lens assembly of the present invention, the first lens element with negative refractive power having a concave image-side surface allows the field of view of the system to be favorably enlarged. The second lens element may have positive or negative refractive power, which allows aberrations produced by the first lens element to be effectively corrected. The third and the fourth lens elements with positive refractive power provide the main refractive power of the system, which allows the total track length of the assembly to be favorably reduced; moreover, by distributing the refractive power of the system to the third and the fourth lens elements, the sensitivity of the system can be favorably reduced. The fifth lens element with negative refractive power allows aberrations produced by the fourth lens element with positive refractive power to be effectively corrected, as well as allows chromatic aberrations of the system to be favorably corrected; the fourth and the fifth lens elements may be attached together to form a doublet lens or may be separate lenses.

In a wide-viewing-angle imaging lens assembly of the present invention, the first lens element may be a meniscus lens element having a convex object-side surface and a concave image-side surface, which allows the field of view of the system to be favorably enlarged and allows the refraction of incident light to be more moderate to prevent aberrations from becoming too large; thus, a balance between enlarging the field of view of the system and correcting aberrations can be favorably achieved. The second lens element may have a convex object-side surface, which favorably corrects aberrations produced by the first lens element having a concave image-side surface with a higher curvature. The third lens element may be a meniscus lens element having a concave object-side surface and a convex image-side surface, which allows astigmatisms of the system to be favorably corrected; moreover, the peripheral portion of the image-side surface of the third lens element can have a higher curvature than the central portion thereof does, which allows the angle at which light is projected onto the sensor from the off-axis field to be effectively reduced, thereby increasing the photosensitivity of the system. The fourth lens element is a bi-convex lens element having convex object-side and image-side surfaces, which allows the refractive power thereof to be favorably distributed, thereby reducing the total track length of the assembly. The fifth lens element has a concave object-side surface, which allows aberrations produced by the bi-convex fourth lens element to be favorably balanced and allows chromatic aberrations of the system to be favorably corrected.

In a wide-viewing-angle imaging lens assembly of the present invention, the stop may be disposed between the front lens group and the rear lens group or between the second lens element and the third lens element. In a wide-angle optical system, it is particularly needed to correct distortions and chromatic aberrations of magnification, and this can be done by placing the stop at a position where the refractive power of the system is balanced. Therefore, in a wide-viewing-angle imaging lens assembly of the present invention, the stop is disposed between the front lens group and the rear lens group. By doing so, the front lens group comprising at least two lens elements allows the system to have a sufficient field of view, and meanwhile, the rear lens group comprising at least three lens elements allows aberrations of the system to be effectively reduced, thereby achieving a wide field of view and good image quality at the same time. Also, such an arrangement of the stop can help reduce the sensitivity of the system. Preferably, the stop is disposed between the second lens element and the third lens element, which allows a better balance to be achieved between minimizing the size of the assembly and enlarging the field of view of the system.

BRIEF DESCRIPTION OF THE DRAWINGS

FIG. 7 is TABLE 1 which lists the optical data of the first embodiment.

FIG. 8 is TABLE 2 which lists the aspheric surface data of the first embodiment.

FIG. 9 is TABLE 3 which lists the optical data of the second embodiment.

FIG. 10 is TABLE 4 which lists the aspheric surface data of the second embodiment.

FIG. 11 is TABLE 5 which lists the optical data of the third embodiment.

FIG. 12 is TABLE 6 which lists the aspheric surface data of the third embodiment.

FIG. 13 is TABLE 7 which lists the optical data of the fourth embodiment.

FIG. 14 is TABLE 8 which lists the aspheric surface data of the fourth embodiment.

FIG. 15 is TABLE 9 which lists the optical data of the fifth embodiment.

FIG. 16 is TABLE 10 which lists the aspheric surface data of the fifth embodiment.

FIG. 17 is TABLE 11 which lists the optical data of the sixth embodiment.

FIG. 18 is TABLE 12 which lists the aspheric surface data of the sixth embodiment.

FIG. 19 is TABLE 13 which lists the data of the respective embodiments resulting from the equations.

DETAILED DESCRIPTION OF THE PREFERRED EMBODIMENTS

Figure 1A:
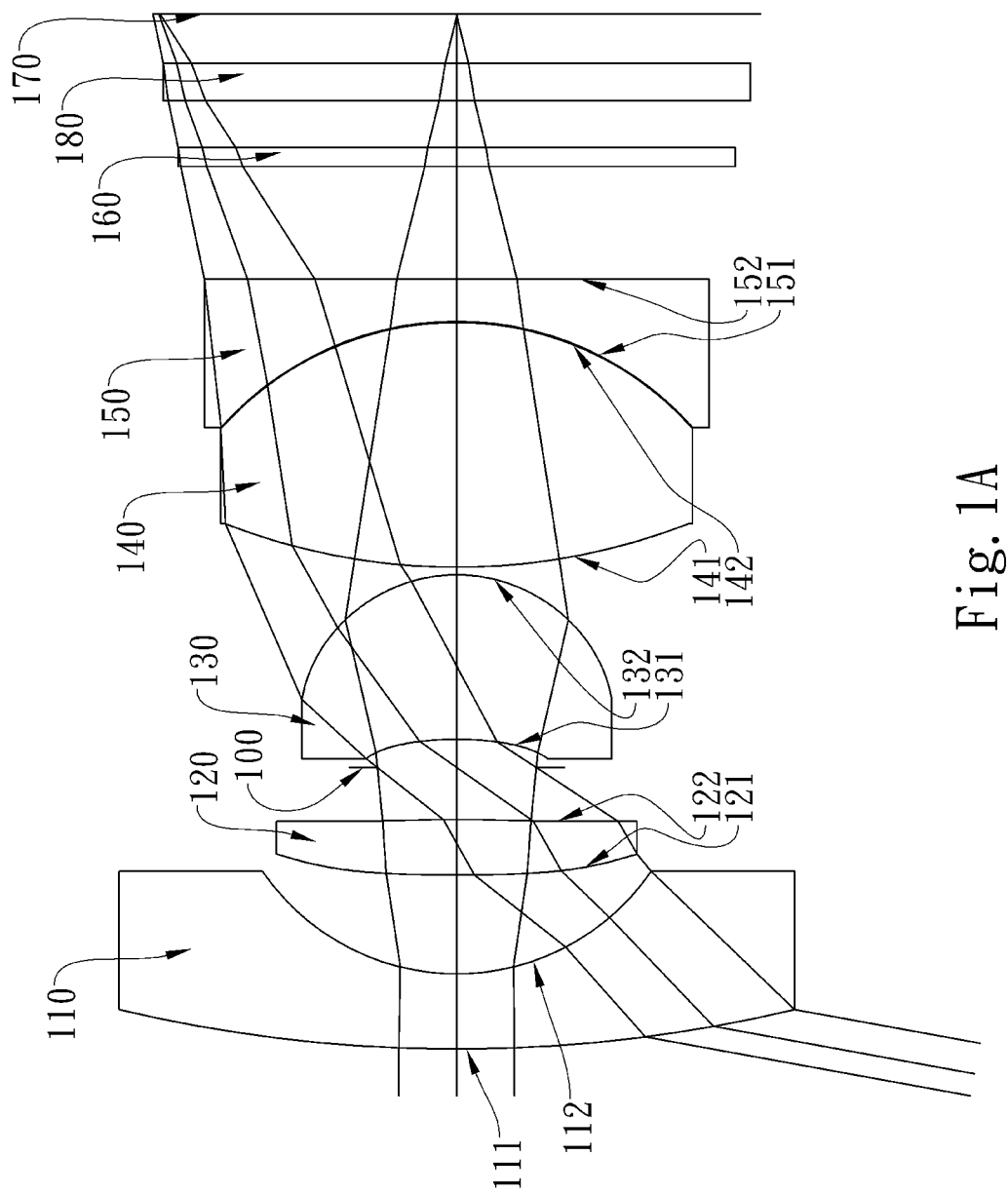
FIG. 1A shows a wide-viewing-angle imaging lens assembly in accordance with a first embodiment of the present invention.

The present invention provides a wide-viewing-angle imaging lens assembly comprising, in order from an object side to an image side: a front lens group, a stop, and a rear lens group. The front lens group comprises, in order from the object side to the image side: a first lens element with negative refractive power having a concave image-side surface and a second lens element. The rear lens group comprises, in order from the object side to the image side: a third lens element with positive refractive power having a concave object-side surface and a convex image-side surface, a fourth lens element with positive refractive power having a convex object-side surface and a convex image-side surface, and a fifth lens element with negative refractive power having a concave object-side surface. In this wide-viewing-angle imaging lens assembly, the lens element with refractive power which is closest to an object is the first lens element, a focal length of the assembly is f, a focal length of the first lens element is $f1$, a focal length of the second lens element is f2, a focal length of the fourth lens element is f4, a distance on an optical axis between the second lens element and the third lens element is T23, a radius of curvature of the object-side surface of the fourth lens element is R7, a radius of curvature of the image-side surface of the fourth lens element is R8, and they satisfy the following relations: $-0.78<f/f1<-0.25$; $0.50<f/f4<1.00$; $|f1/f2|<0.60$; $0.02<T23/f<0.68$; and $-3.50<R7/R8<-0.50$.

When the relation of $-0.78<f/f1<-0.25$ is satisfied, a balance between enlarging the field of view of the system and reducing the total track length of the assembly can be favorably achieved. When the relation of $0.50<f/f4<1.00$ is satisfied, the refractive power of the fourth lens element can be distributed in a more balanced manner; this allows the total track length of the system to be effectively controlled and prevents high order spherical aberrations from increasing excessively, thereby improving image quality of the system. When the relation of $|f1/f2|<0.60$ is satisfied, the refractive power of the first lens element and the second lens element can be distributed more appropriately; this allows a wide field of view to be favorably achieved and aberrations of the system to be effectively corrected. When the relation of $0.02<T23/f<0.68$ is satisfied, the distance on the optical axis between the second lens element and the third lens element is more appropriate, so that it is not too short and makes the assembling process difficult, or too long and affects minimizing the size of the assembly. When the relation of $-3.50<R7/R8<-0.50$ is satisfied, spherical aberrations of the system can be favorably corrected, and preferably, the following relation is satisfied: $-2.80<R7/R8<-1.20$.

In the aforementioned wide-viewing-angle imaging lens assembly, preferably, the number of lens elements with refractive power does not exceed six; an appropriate number of lens elements can prevent the total track length from becoming too long, reduce the complexity of the assembling process, and lower the production cost. Preferably, the second lens element has positive refractive power with a convex object-side surface; this allows aberrations produced by the first lens element to be corrected when it has a concave image-side surface with a higher curvature, thereby improving image quality of the system. Preferably, the peripheral portion of the image-side surface of the third lens element has a higher curvature than the central portion thereof does; this allows the angle at which light is projected onto the sensor from the off-axis field to be favorably reduced, thereby increasing photosensitivity of the system. Preferably, the assembly comprises at least two lens elements having aspheric surfaces; aspheric surfaces can be easily made into non-spherical profiles and thus allow more design parameter freedom which can be used to reduce aberrations and the total number of lens elements, thereby reducing the total track length of the assembly effectively.

In the aforementioned wide-viewing-angle imaging lens assembly, preferably, the assembly is further provided with an electronic sensor disposed at the image plane for image formation of the object, half of the diagonal length of the effective pixel area of the electronic sensor is ImgH, the focal length of the assembly is f, and preferably, they satisfy the following relation: $0.93<ImgH/f<2.30$. When this relation is satisfied, a sufficient field of view can be favorably achieved for the assembly; further preferably, the following relation is satisfied: $1.05<ImgH/f<1.70$.

In the aforementioned wide-viewing-angle imaging lens assembly, the radius of curvature of the object-side surface of the first lens element is R1, the radius of curvature of the image-side surface of the first lens element is R2, and they satisfy the following relation: $1.07<(R1+R2)/(R1-R2)<2.50$.

When this relation is satisfied, the first lens element can maintain a meniscus shape effectively; this allows the refraction of incident light to be more moderate as the field of view of the system is enlarged, thereby preventing aberrations from increasing excessively.

In the aforementioned wide-viewing-angle imaging lens assembly, the Abbe number of the first lens element is V1, the Abbe number of the second lens element is V2, and preferably, they satisfy the following relation: $20.0<V1-V2<42.0$. When this relation is satisfied, chromatic aberrations of the assembly can be favorably corrected.

In the aforementioned wide-viewing-angle imaging lens assembly, the radius of curvature of the image-side surface of the third lens element is R6, the radius of curvature of the object-side surface of the third lens element is R5, and preferably, they satisfy the following relation: $0.05<R6/R5<0.75$. When this relation is satisfied, astigmatisms and high order aberrations of the system can be favorably corrected, thereby increasing the resolution of the system.

In the aforementioned wide-viewing-angle imaging lens assembly, an electronic sensor disposed at the image plane for image formation of the object is further provided, the distance on the optical axis between the stop and the electronic sensor is SL, the distance on the optical axis between the object-side surface of the first lens element and the electronic sensor is TTL, and preferably, they satisfy the following relation: $0.50<SL/TTL<0.78$. When this relation is satisfied, a balance between minimizing the size of the assembly and enlarging the field of view of the system can be favorably achieved.

In the aforementioned wide-viewing-angle imaging lens assembly, an electronic sensor disposed at the image plane for image formation of the object is further provided, the distance on the optical axis between the object-side surface of the first lens element and the electronic sensor is TTL, half of the diagonal length of the effective pixel area of the electronic sensor is ImgH, and preferably, they satisfy the following relation: $TTL/ImgH<5.2$. When this relation is satisfied, the assembly can maintain a compact size favorably.

Moreover, the present invention provides a wide-viewing-angle imaging lens assembly comprising, in order from an object side to an image side: a first lens element with negative refractive power having a convex object-side surface and a concave image-side surface, a second lens element, a third lens element with positive refractive power having a convex image-side surface, a fourth lens element with positive refractive power having a convex object-side surface and a convex image-side surface, and a fifth lens element with negative refractive power having a concave object-side surface. In this wide-viewing-angle imaging lens assembly, there are five lens elements with refractive power. The assembly is further provided with an electronic sensor disposed at an image plane for image formation of an object, a focal length of the assembly is f, a focal length of the first lens element is f1, a focal length of the second lens element is f2, a distance on an optical axis between the second lens element and the third lens element is T23, half of a diagonal length of an effective pixel area of the electronic sensor is ImgH, and they satisfy the following relations: $-0.78<f/f1<-0.25$; $|f1/f2|<0.60$; $0.02<T23/f<0.68$; and $0.93<ImgH/f<2.30$.

When the relation of $-0.78<f/f1<-0.25$ is satisfied, a balance between enlarging the field of view of the system and reducing the total track length of the assembly can be favorably achieved. When the relation of $|f1/f2|<0.60$ is satisfied, the refractive power of the first lens element and the second lens element can be distributed more appropriately; this allows a wide field of view to be favorably achieved and aberrations of the system to be effectively corrected. When the relation of $0.02<T23/f<0.68$ is satisfied, the distance on the optical axis between the second lens element and the third lens element is more appropriate, so that it is not too short and makes the assembling process difficult, or too long and affects minimizing the size of the assembly. When the relation of $0.93<ImgH/f<2.30$ is satisfied, a sufficient field of view can be favorably achieved for the assembly; preferably, the following relation is satisfied: $1.05<ImgH/f<1.70$.

In the aforementioned wide-viewing-angle imaging lens assembly, preferably, the second lens element has positive refractive power with a convex object-side surface; this allows aberrations produced by the first lens element to be corrected when it has a concave image-side surface with a higher curvature, thereby improving image quality of the system. Preferably, the assembly comprises at least two lens elements having aspheric surfaces; aspheric surfaces can be easily made into non-spherical profiles and thus allow more design parameter freedom which can be used to reduce aberrations and the total number of lens elements, thereby reducing the total track length of the assembly effectively.

In the aforementioned wide-viewing-angle imaging lens assembly, preferably, a stop disposed between the second lens element and the third lens element is further provided, the distance on the optical axis between the stop and the electronic sensor is SL, the distance on the optical axis between the object-side surface of the first lens element and the electronic sensor is TTL, and preferably, they satisfy the following relation: $0.50<SL/TTL<0.78$. When this relation is satisfied, a balance between minimizing the size of the assembly and enlarging the field of view of the system can be favorably achieved.

In the aforementioned wide-viewing-angle imaging lens assembly, the radius of curvature of the object-side surface of the first lens element is R1, the radius of curvature of the image-side surface of the first lens element is R2, and they satisfy the following relation: $1.07<(R1+R2)/(R1-R2)<2.50$. When this relation is satisfied, the first lens element can maintain a meniscus shape effectively; this allows the refraction of incident light to be more moderate as the field of view of the system is enlarged, thereby preventing aberrations from increasing excessively.

In the aforementioned wide-viewing-angle imaging lens assembly, the radius of curvature of the image-side surface of the third lens element is R6, the radius of curvature of the object-side surface of the third lens element is R5, and preferably, they satisfy the following relation: $0.05<R6/R5<0.75$. When this relation is satisfied, astigmatisms and high order aberrations of the system can be favorably corrected, thereby increasing the resolution of the system.

In the aforementioned wide-viewing-angle imaging lens assembly, the radius of curvature of the object-side surface of the fifth lens element is R9, the radius of curvature of the image-side surface of the fifth lens element is R10, and preferably, they satisfy the following relation: $-0.30<R9/R10<0.30$. When this relation is satisfied, the fifth lens element can have appropriate negative refractive power; this allows aberrations produced by the fourth lens element to be effectively corrected, thereby improving image quality of the system.

Furthermore, the present invention provides a wide-viewing-angle imaging lens assembly comprising, in order from an object side to an image side: a first lens element with negative refractive power having a convex object-side surface and a concave image-side surface, a second lens element, a third lens element with positive refractive power having a convex image-side surface, a fourth lens element with positive refractive power having a convex object-side surface and a convex image-side surface, and a fifth lens element with negative refractive power having a concave object-side surface. In this wide-viewing-angle imaging lens assembly, a focal length of the first lens element is f1, a focal length of the second lens element is f2, and they satisfy the following relation: $|f1/f2|<0.60$.

When the relation of $|f1/f2|<0.60$ is satisfied, the refractive power of the first lens element and the second lens element can be distributed more appropriately; this allows a wide field of view to be favorably achieved and aberrations of the system to be effectively corrected.

In the aforementioned wide-viewing-angle imaging lens assembly, preferably, the second lens element has positive refractive power; this allows aberrations produced by the first lens element to be corrected when it has a concave image-side surface with a higher curvature, thereby improving image quality of the system. Preferably, the peripheral portion of the image-side surface of the third lens element has a higher curvature than the central portion thereof does; this allows the angle at which light is projected onto the sensor from the off-axis field to be favorably reduced, thereby increasing photosensitivity of the system. Preferably, the assembly comprises at least two lens elements having aspheric surfaces; aspheric surfaces can be easily made into non-spherical profiles and thus allow more design parameter freedom which can be used to reduce aberrations and the total number of lens elements, thereby reducing the total track length of the assembly effectively.

In the aforementioned wide-viewing-angle imaging lens assembly, the focal length of the assembly is f, the focal length of the first lens element is f1, and preferably, they satisfy the following relation: $-0.78<f/t1<-0.25$. When this relation is satisfied, a balance between enlarging the field of view of the system and reducing the total track length of the assembly can be favorably achieved.

In the aforementioned wide-viewing-angle imaging lens assembly, the radius of curvature of the image-side surface of the third lens element is R6, the radius of curvature of the object-side surface of the third lens element is R5, and preferably, they satisfy the following relation: $0.05<R6/R5<0.75$. When this relation is satisfied, astigmatisms and high order aberrations of the system can be favorably corrected, thereby increasing the resolution of the system.

In a wide-viewing-angle imaging lens assembly of the present invention, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the total number of the lens elements, so that the total track length of the assembly can be reduced effectively.

In a wide-viewing-angle imaging lens assembly of the present invention, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1B:
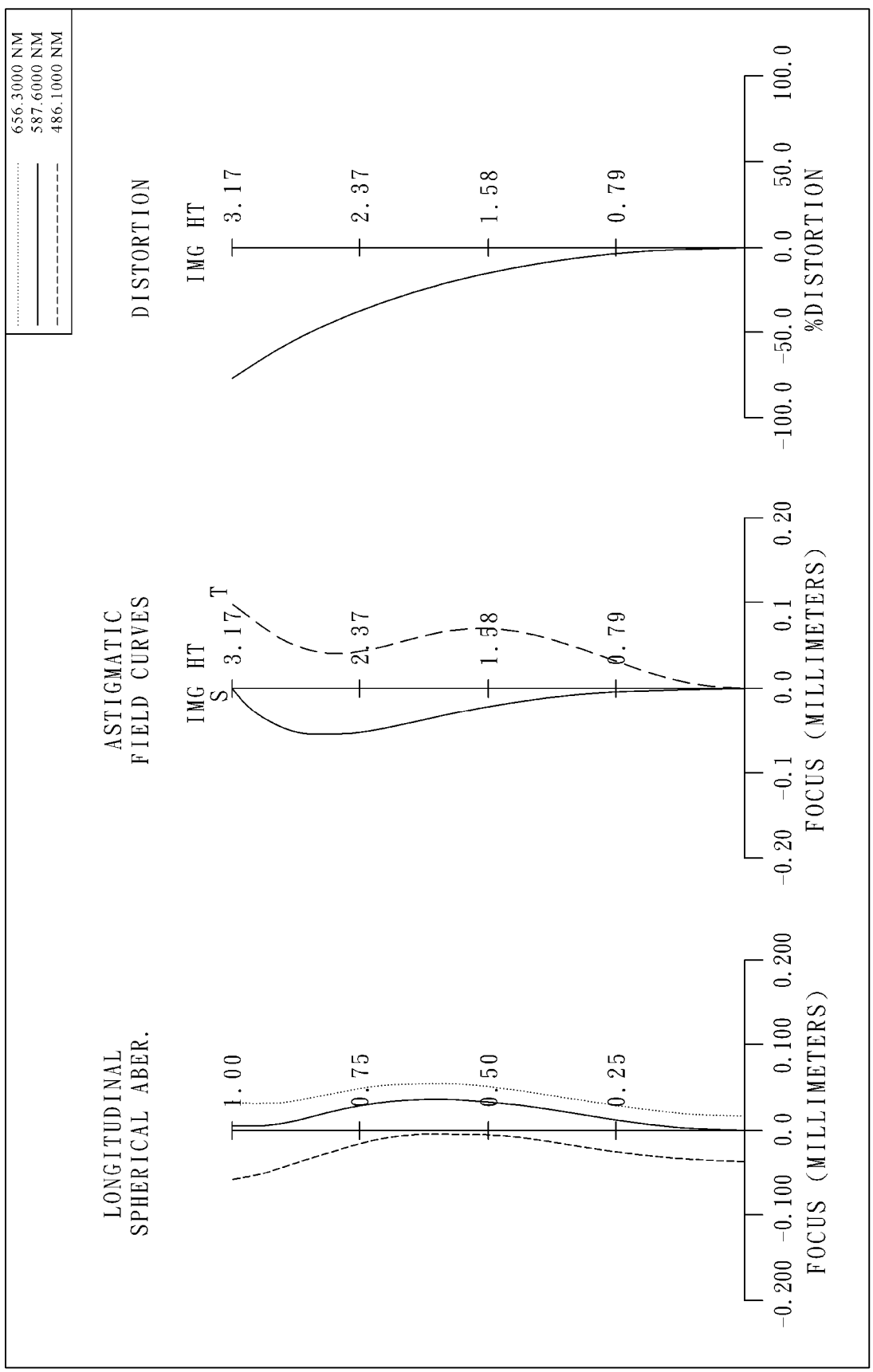
FIG. 1B shows the aberration curves of the first embodiment of the present invention.

FIG. 1A shows a wide-viewing-angle imaging lens assembly in accordance with a first embodiment of the present invention, and FIG. 1B shows the aberration curves of the first embodiment of the present invention. The wide-viewing-angle imaging lens assembly in the first embodiment mainly comprises five lens elements, in order from an object side to an image side: a front lens group, a stop 100, and a rear lens group. The front lens group comprises, in order from the object side to the image side: a glass first lens element 110 with negative refractive power having a convex object-side surface 111 and a concave image-side surface 112; and a plastic second lens element 120 with positive refractive power having a convex object-side surface 121 and a convex image-side surface 122, both of the surfaces 121 and 122 being aspheric. The rear lens group comprises, in order from the object side to the image side: a plastic third lens element 130 with positive refractive power having a concave object-side surface 131 and a convex image-side surface 132, wherein both of the surfaces 131 and 132 are aspheric, and the peripheral portion of the image-side surface 132 has a higher curvature than the central portion thereof does; a glass fourth lens element 140 with positive refractive power having a convex object-side surface 141 and a convex image-side surface 142; and a glass fifth lens element 150 with negative refractive power having a concave object-side surface 151 and a flat image-side surface 152, wherein the image-side surface 142 of the fourth lens element 140 and the object-side surface 151 of the fifth lens element 150 are attached together. The stop 100 is disposed between the second lens element 120 and the third lens element 130. The wide-viewing-angle imaging lens assembly further comprises an IR filter 160 disposed between the image-side surface 152 of the fifth lens element 150 and an image plane 170, and a cover glass 180 disposed between the IR filter 160 and the image plane 170; the IR filter 160 and the cover glass 180 are made of glass and have no influence on the focal length of the wide-viewing-angle imaging lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present wide-viewing-angle imaging lens assembly, the focal length of the assembly is f, and it satisfies the relation: f=2.56 (mm).

In the first embodiment of the present wide-viewing-angle imaging lens assembly, the f-number of the assembly is Fno, and it satisfies the relation: Fno=2.08.

In the first embodiment of the present wide-viewing-angle imaging lens assembly, half of the maximum field of view of the assembly is HFOV, and it satisfies the relation: HFOV=79.7 (degrees).

In the first embodiment of the present wide-viewing-angle imaging lens assembly, the Abbe number of the first lens element 110 is V1, the Abbe number of the second lens element 120 is V2, and they satisfy the relation: V1−V2=32.1.

In the first embodiment of the present wide-viewing-angle imaging lens assembly, the focal length of the assembly is f, the focal length of the first lens element 110 is f1, and they satisfy the relation: f/f1=−0.58.

In the first embodiment of the present wide-viewing-angle imaging lens assembly, the focal length of the assembly is f, the focal length of the fourth lens element 140 is f4, and they satisfy the relation: f/f4=0.74.

In the first embodiment of the present wide-viewing-angle imaging lens assembly, the focal length of the first lens element 110 is f1, the focal length of the second lens element 120 is f2, and they satisfy the relation: |f1/f2|=0.34.

In the first embodiment of the present wide-viewing-angle imaging lens assembly, the radius of curvature of the image-side surface 132 of the third lens element 130 is R6, the radius of curvature of the object-side surface 131 of the third lens element 130 is R5, and they satisfy the relation: R6/R5=0.46.

In the first embodiment of the present wide-viewing-angle imaging lens assembly, the radius of curvature of the object-side surface 141 of the fourth lens element 140 is R7, the radius of curvature of the image-side surface 142 of the fourth lens element 140 is R8, and they satisfy the relation: R7/R8=−2.03.

In the first embodiment of the present wide-viewing-angle imaging lens assembly, the radius of curvature of the object-side surface 151 of the fifth lens element 150 is R9, the radius of curvature of the image-side surface 152 of the fifth lens element 150 is R10, and they satisfy the relation: R9/R10=0.00.

In the first embodiment of the present wide-viewing-angle imaging lens assembly, the radius of curvature of the object-side surface 111 of the first lens element 110 is R1, the radius of curvature of the image-side surface 112 of the first lens element 110 is R2, and they satisfy the relation: (R1+R2)/(R1−R2)=1.38.

In the first embodiment of the present wide-viewing-angle imaging lens assembly, the distance on the optical axis between the second lens element 120 and the third lens element 130 is T23, the focal length of the assembly is f, and they satisfy the relation: T23/f=0.33.

In the first embodiment of the present wide-viewing-angle imaging lens assembly, an electronic sensor disposed at the image plane 170 is further provided for image formation of the object, half of the diagonal length of the effective pixel area of the electronic sensor is ImgH, the focal length of the assembly is f, and they satisfy the relation: ImgH/f=1.24.

In the first embodiment of the present wide-viewing-angle imaging lens assembly, the distance on the optical axis between the stop 100 and the electronic sensor is SL, the distance on the optical axis between the object-side surface 111 of the first lens element 110 and the electronic sensor is TTL, and they satisfy the relation: SL/TTL=0.72.

In the first embodiment of the present wide-viewing-angle imaging lens assembly, the distance on the optical axis between the object-side surface 111 of the first lens element 110 and the electronic sensor is TTL, half of the diagonal length of the effective pixel area of the electronic sensor is ImgH, and they satisfy the relation: TTL/ImgH=3.41.

The detailed optical data of the first embodiment is shown in FIG. 7 (TABLE 1), and the aspheric surface data is shown in FIG. 8 (TABLE 2), wherein the units of the radius of curvature, the thickness and the focal length are expressed in mm, and HFOV is half of the maximum field of view.

Figure 2A:
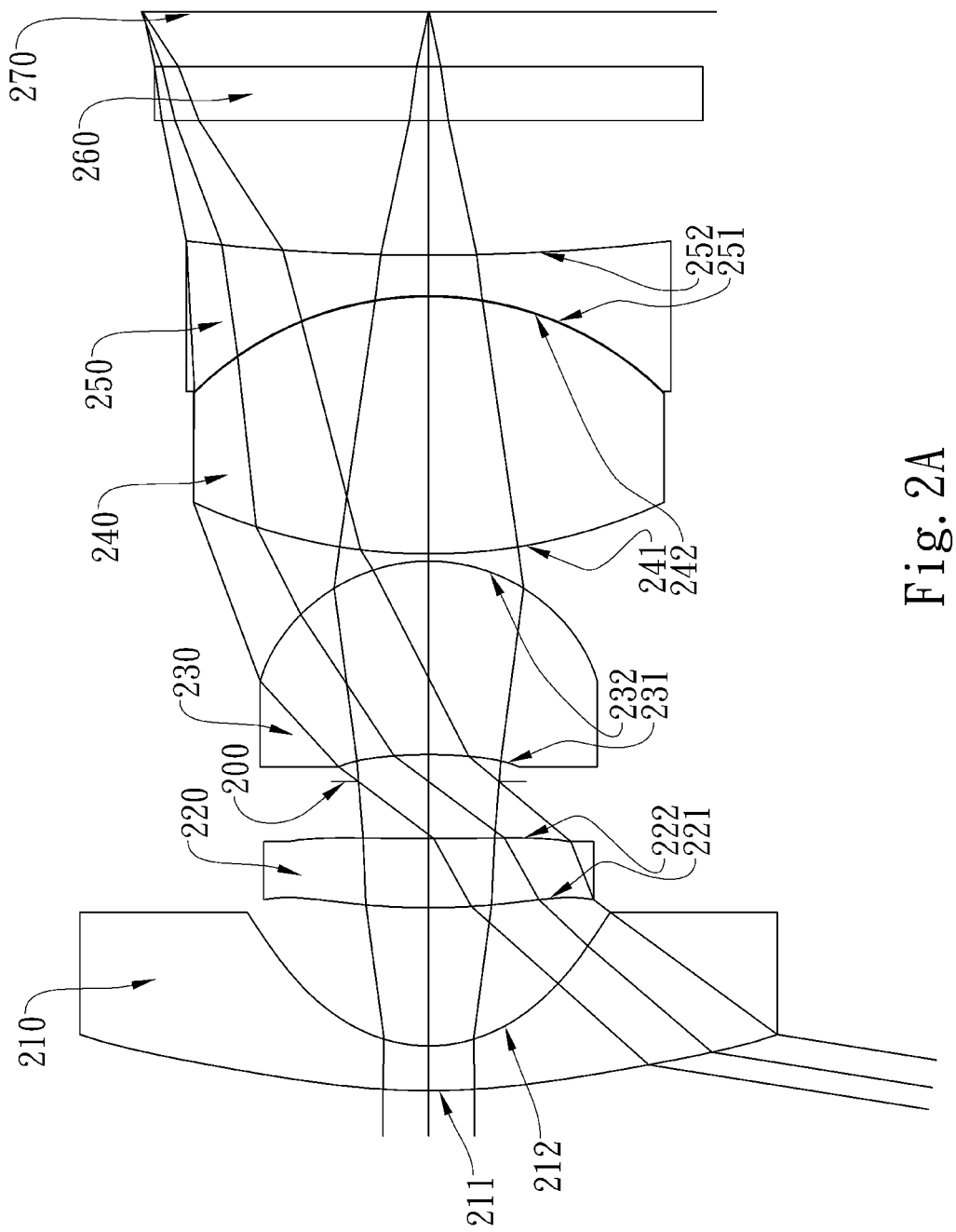
FIG. 2A shows a wide-viewing-angle imaging lens assembly in accordance with a second embodiment of the present invention.
Figure 2B:
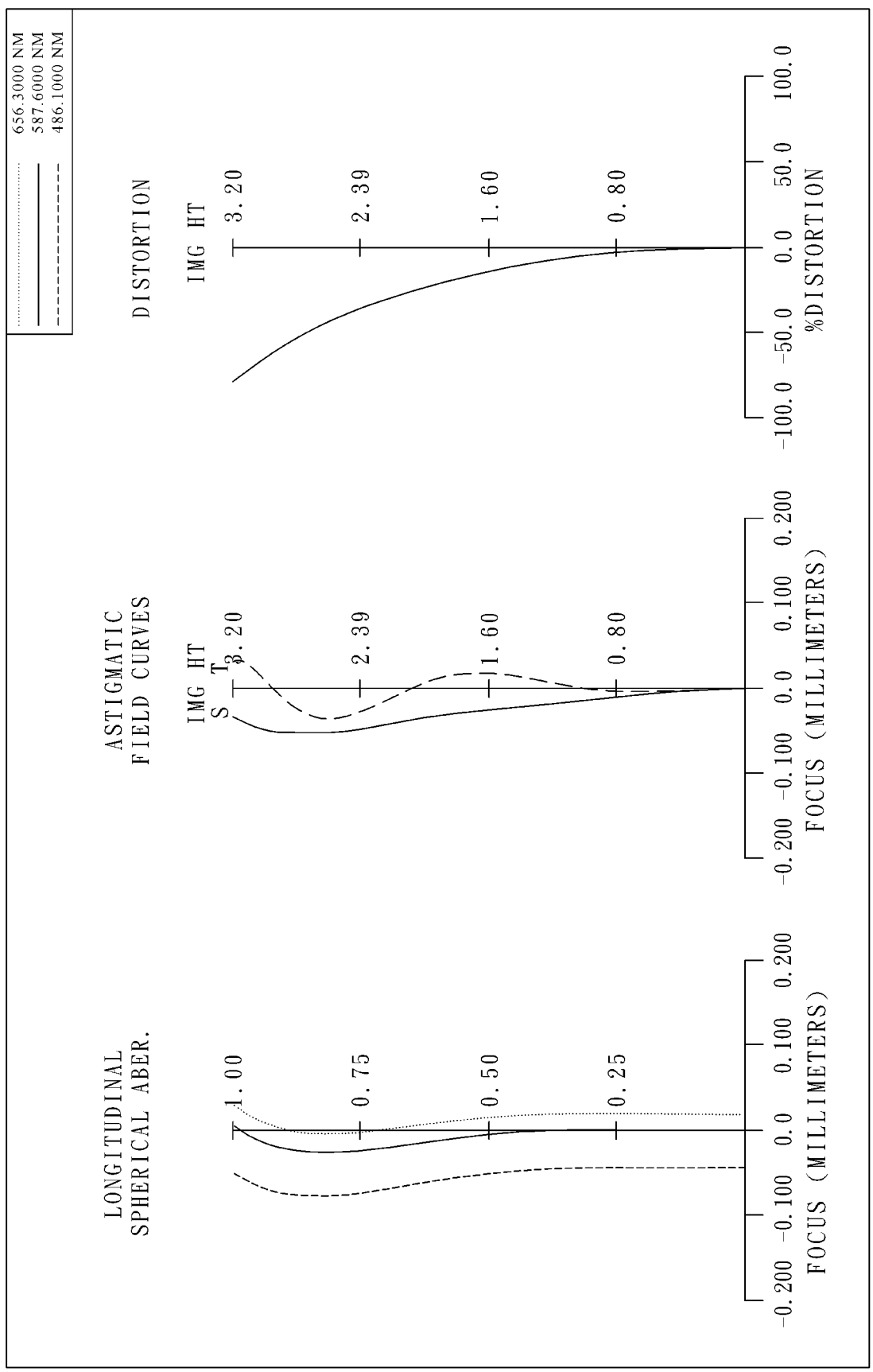
FIG. 2B shows the aberration curves of the second embodiment of the present invention.

FIG. 2A shows a wide-viewing-angle imaging lens assembly in accordance with a second embodiment of the present invention, and FIG. 2B shows the aberration curves of the second embodiment of the present invention. The wide-viewing-angle imaging lens assembly in the second embodiment mainly comprises five lens elements, in order from an object side to an image side: a front lens group, a stop 200, and a rear lens group. The front lens group comprises, in order from the object side to the image side: a plastic first lens element 210 with negative refractive power having a convex object-side surface 211 and a concave image-side surface 212, both of the surfaces 211 and 212 being aspheric; and a plastic second lens element 220 with positive refractive power having a convex object-side surface 221 and a concave image-side surface 222, both of the surfaces 221 and 222 being aspheric. The rear lens group comprises, in order from the object side to the image side: a plastic third lens element 230 with positive refractive power having a concave object-side surface 231 and a convex image-side surface 232, wherein both of the surfaces 231 and 232 are aspheric, and the peripheral portion of the image-side surface 232 has a higher curvature than the central portion thereof does; a glass fourth lens element 240 with positive refractive power having a convex object-side surface 241 and a convex image-side surface 242; and a glass fifth lens element 250 with negative refractive power having a concave object-side surface 251 and a concave image-side surface 252, wherein the image-side surface 242 of the fourth lens element 240 and the object-side surface 251 of the fifth lens element 250 are attached together. The stop 200 is disposed between the second lens element 220 and the third lens element 230. The wide-viewing-angle imaging lens assembly further comprises an IR filter 260 disposed between the image-side surface 252 of the fifth lens element 250 and an image plane 270; the IR filter 260 is made of glass and has no influence on the focal length of the wide-viewing-angle imaging lens assembly.

The equation of the aspheric surface profiles of the second embodiment has the same form as that of the first embodiment.

In the second embodiment of the present wide-viewing-angle imaging lens assembly, the focal length of the assembly is f, and it satisfies the relation: f=2.45 (mm).

In the second embodiment of the present wide-viewing-angle imaging lens assembly, the f-number of the assembly is Fno, and it satisfies the relation: Fno=2.40.

In the second embodiment of the present wide-viewing-angle imaging lens assembly, half of the maximum field of view of the assembly is HFOV, and it satisfies the relation: HFOV=80.9 (degrees).

In the second embodiment of the present wide-viewing-angle imaging lens assembly, the Abbe number of the first lens element 210 is V1, the Abbe number of the second lens element 220 is V2, and they satisfy the relation: V1−V2=34.5.

In the second embodiment of the present wide-viewing-angle imaging lens assembly, the focal length of the assembly is f, the focal length of the first lens element 210 is f1, and they satisfy the relation: f/f1=−0.61.

In the second embodiment of the present wide-viewing-angle imaging lens assembly, the focal length of the assembly is f, the focal length of the fourth lens element 240 is f4, and they satisfy the relation: f/f4=0.67.

In the second embodiment of the present wide-viewing-angle imaging lens assembly, the focal length of the first lens element 210 is f1, the focal length of the second lens element 220 is f2, and they satisfy the relation: |f1/f2|=0.29.

In the second embodiment of the present wide-viewing-angle imaging lens assembly, the radius of curvature of the image-side surface 232 of the third lens element 230 is R6, the radius of curvature of the object-side surface 231 of the third lens element 230 is R5, and they satisfy the relation: R6/R5=0.32.

In the second embodiment of the present wide-viewing-angle imaging lens assembly, the radius of curvature of the object-side surface 241 of the fourth lens element 240 is R7, the radius of curvature of the image-side surface 242 of the fourth lens element 240 is R8, and they satisfy the relation: R7/R8=−1.68.

In the second embodiment of the present wide-viewing-angle imaging lens assembly, the radius of curvature of the object-side surface 251 of the fifth lens element 250 is R9, the radius of curvature of the image-side surface 252 of the fifth lens element 250 is R10, and they satisfy the relation: R9/R10=−0.16.

In the second embodiment of the present wide-viewing-angle imaging lens assembly, the radius of curvature of the object-side surface 211 of the first lens element 210 is R1, the radius of curvature of the image-side surface 212 of the first lens element 210 is R2, and they satisfy the relation: (R1+R2)/(R1−R2)=1.55.

In the second embodiment of the present wide-viewing-angle imaging lens assembly, the distance on the optical axis between the second lens element 220 and the third lens element 230 is T23, the focal length of the assembly is f, and they satisfy the relation: T23/f=0.38.

In the second embodiment of the present wide-viewing-angle imaging lens assembly, an electronic sensor disposed at the image plane 270 is further provided for image formation of the object, half of the diagonal length of the effective pixel area of the electronic sensor is ImgH, the focal length of the assembly is f, and they satisfy the relation: ImgH/f=1.31.

In the second embodiment of the present wide-viewing-angle imaging lens assembly, the distance on the optical axis between the stop 200 and the electronic sensor is SL, the distance on the optical axis between the object-side surface 211 of the first lens element 210 and the electronic sensor is TTL, and they satisfy the relation: SL/TTL=0.71.

In the second embodiment of the present wide-viewing-angle imaging lens assembly, the distance on the optical axis between the object-side surface 211 of the first lens element 210 and the electronic sensor is TTL, half of the diagonal length of the effective pixel area of the electronic sensor is ImgH, and they satisfy the relation: TTL/ImgH=3.69.

The detailed optical data of the second embodiment is shown in FIG. 9 (TABLE 3), and the aspheric surface data is shown in FIG. 10 (TABLE 4), wherein the units of the radius of curvature, the thickness and the focal length are expressed in mm, and HFOV is half of the maximum field of view.

Figure 3A:
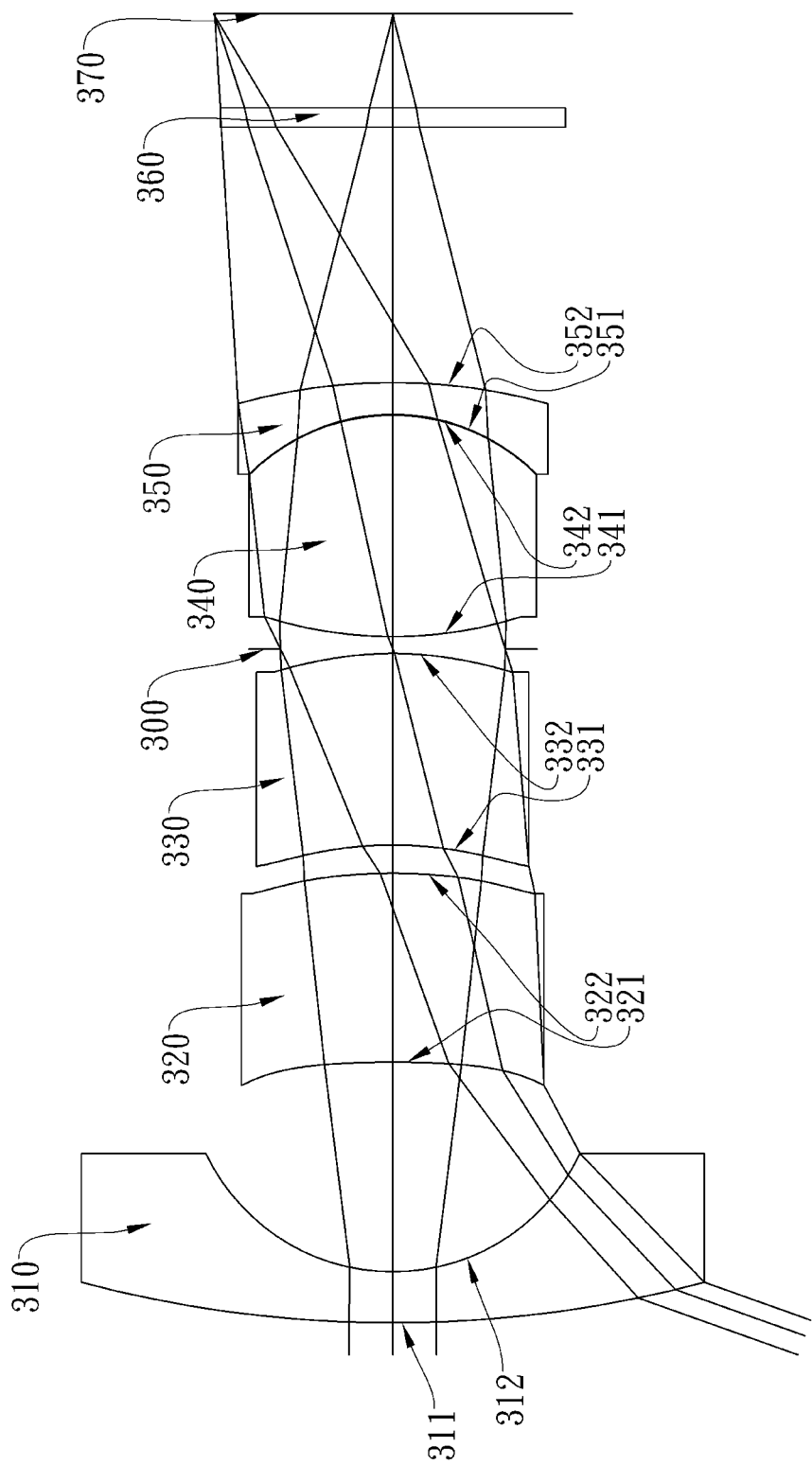
FIG. 3A shows a wide-viewing-angle imaging lens assembly in accordance with a third embodiment of the present invention.
Figure 3B:
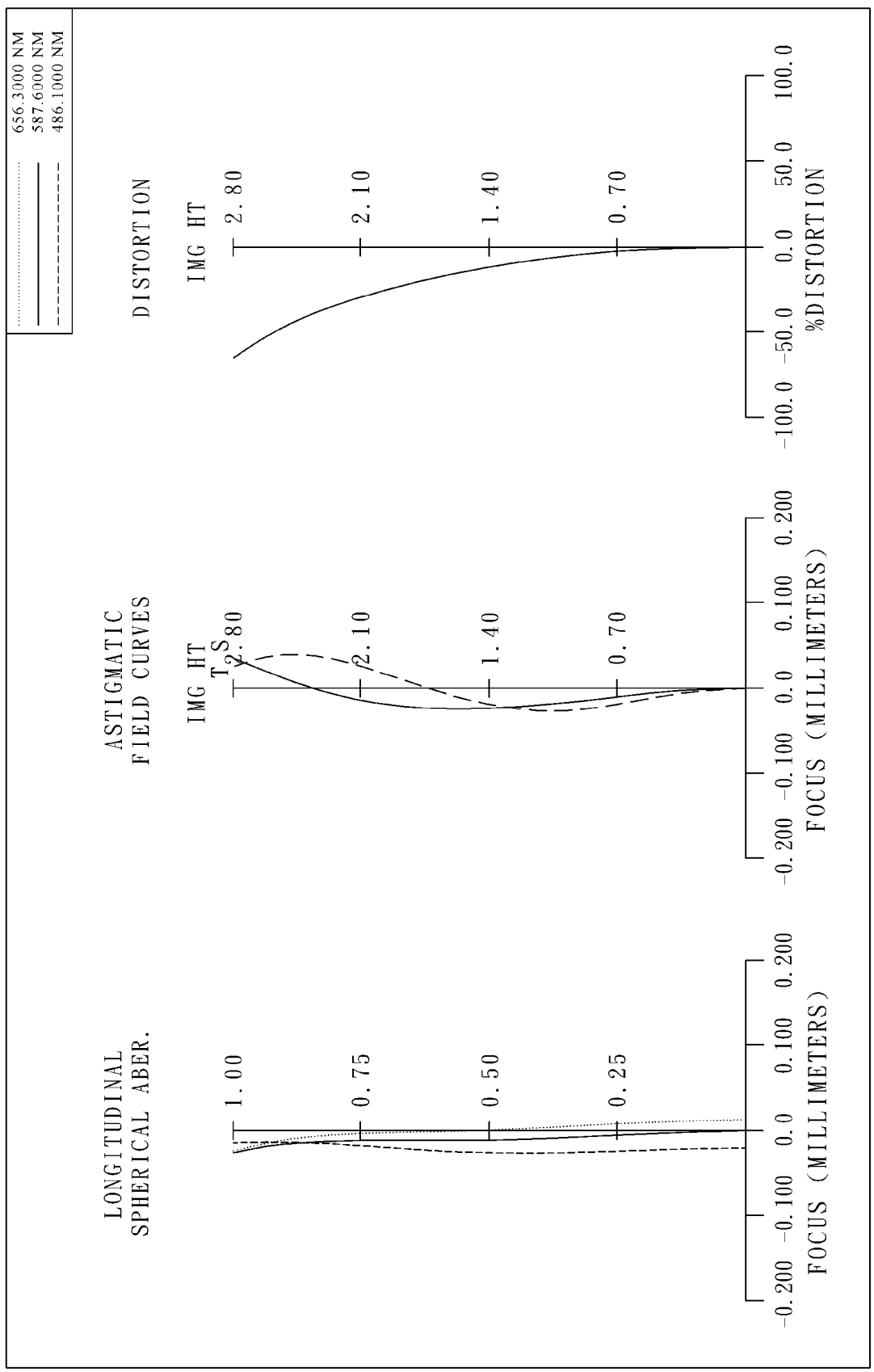
FIG. 3B shows the aberration curves of the third embodiment of the present invention.

FIG. 3A shows a wide-viewing-angle imaging lens assembly in accordance with a third embodiment of the present invention, and FIG. 3B shows the aberration curves of the third embodiment of the present invention. The wide-viewing-angle imaging lens assembly in the third embodiment mainly comprises five lens elements, in order from an object side to an image side: a front lens group, a stop 300, and a rear lens group. The front lens group comprises, in order from the object side to the image side: a glass first lens element 310 with negative refractive power having a convex object-side surface 311 and a concave image-side surface 312; a plastic second lens element 320 with positive refractive power having a concave object-side surface 321 and a convex image-side surface 322, both of the surfaces 321 and 322 being aspheric; and a plastic third lens element 330 with positive refractive power having a concave object-side surface 331 and a convex image-side surface 332, both of the surfaces 331 and 332 being aspheric. The rear lens group comprises, in order from the object side to the image side: a glass fourth lens element 340 with positive refractive power having a convex object-side surface 341 and a convex image-side surface 342; and a glass fifth lens element 350 with negative refractive power having a concave object-side surface 351 and a convex image-side surface 352, wherein the image-side surface 342 of the fourth lens element 340 and the object-side surface 351 of the fifth lens element 350 are attached together. The stop 300 is disposed between the third lens element 330 and the fourth lens element 340. The wide-viewing-angle imaging lens assembly further comprises an IR filter 360 disposed between the image-side surface 352 of the fifth lens element 350 and an image plane 370; the IR filter 360 is made of glass and has no influence on the focal length of the wide-viewing-angle imaging lens assembly.

The equation of the aspheric surface profiles of the third embodiment has the same form as that of the first embodiment.

In the third embodiment of the present wide-viewing-angle imaging lens assembly, the focal length of the assembly is f, and it satisfies the relation: f=2.81 (mm).

In the third embodiment of the present wide-viewing-angle imaging lens assembly, the f-number of the assembly is Fno, and it satisfies the relation: Fno=2.05.

In the third embodiment of the present wide-viewing-angle imaging lens assembly, half of the maximum field of view of the assembly is HFOV, and it satisfies the relation: HFOV=70.4 (degrees).

In the third embodiment of the present wide-viewing-angle imaging lens assembly, the Abbe number of the first lens element 310 is V1, the Abbe number of the second lens element 320 is V2, and they satisfy the relation: V1−V2=32.1.

In the third embodiment of the present wide-viewing-angle imaging lens assembly, the focal length of the assembly is f, the focal length of the first lens element 310 is f1, and they satisfy the relation: f/f1=−0.49.

In the third embodiment of the present wide-viewing-angle imaging lens assembly, the focal length of the assembly is f, the focal length of the fourth lens element 340 is f4, and they satisfy the relation: f/f4=0.81.

In the third embodiment of the present wide-viewing-angle imaging lens assembly, the focal length of the first lens element 310 is f1, the focal length of the second lens element 320 is f2, and they satisfy the relation: |f1/f2|=0.20.

In the third embodiment of the present wide-viewing-angle imaging lens assembly, the radius of curvature of the image-side surface 332 of the third lens element 330 is R6, the radius of curvature of the object-side surface 331 of the third lens element 330 is R5, and they satisfy the relation: R6/R5=0.93.

In the third embodiment of the present wide-viewing-angle imaging lens assembly, the radius of curvature of the object-side surface 341 of the fourth lens element 340 is R7, the radius of curvature of the image-side surface 342 of the fourth lens element 340 is R8, and they satisfy the relation: R7/R8=−2.11.

In the third embodiment of the present wide-viewing-angle imaging lens assembly, the radius of curvature of the object-side surface 351 of the fifth lens element 350 is R9, the radius of curvature of the image-side surface 352 of the fifth lens element 350 is R10, and they satisfy the relation: R9/R10=0.35.

In the third embodiment of the present wide-viewing-angle imaging lens assembly, the radius of curvature of the object-side surface 311 of the first lens element 310 is R1, the radius of curvature of the image-side surface 312 of the first lens element 310 is R2, and they satisfy the relation: (R1+R2)/(R1−R2)=1.41.

In the third embodiment of the present wide-viewing-angle imaging lens assembly, the distance on the optical axis between the second lens element 320 and the third lens element 330 is T23, the focal length of the assembly is f, and they satisfy the relation: T23/f=0.16.

In the third embodiment of the present wide-viewing-angle imaging lens assembly, an electronic sensor disposed at the image plane 370 is further provided for image formation of the object, half of the diagonal length of the effective pixel area of the electronic sensor is ImgH, the focal length of the assembly is f, and they satisfy the relation: ImgH/f=1.00.

In the third embodiment of the present wide-viewing-angle imaging lens assembly, the distance on the optical axis between the stop 300 and the electronic sensor is SL, the distance on the optical axis between the object-side surface 311 of the first lens element 310 and the electronic sensor is TTL, and they satisfy the relation: SL/TTL=0.48.

In the third embodiment of the present wide-viewing-angle imaging lens assembly, the distance on the optical axis between the object-side surface 311 of the first lens element 310 and the electronic sensor is TTL, half of the diagonal length of the effective pixel area of the electronic sensor is ImgH, and they satisfy the relation: TTL/ImgH=7.29.

The detailed optical data of the third embodiment is shown in FIG. 11 (TABLE 5), and the aspheric surface data is shown in FIG. 12 (TABLE 6), wherein the units of the radius of curvature, the thickness and the focal length are expressed in mm, and HFOV is half of the maximum field of view.

Figure 4A:
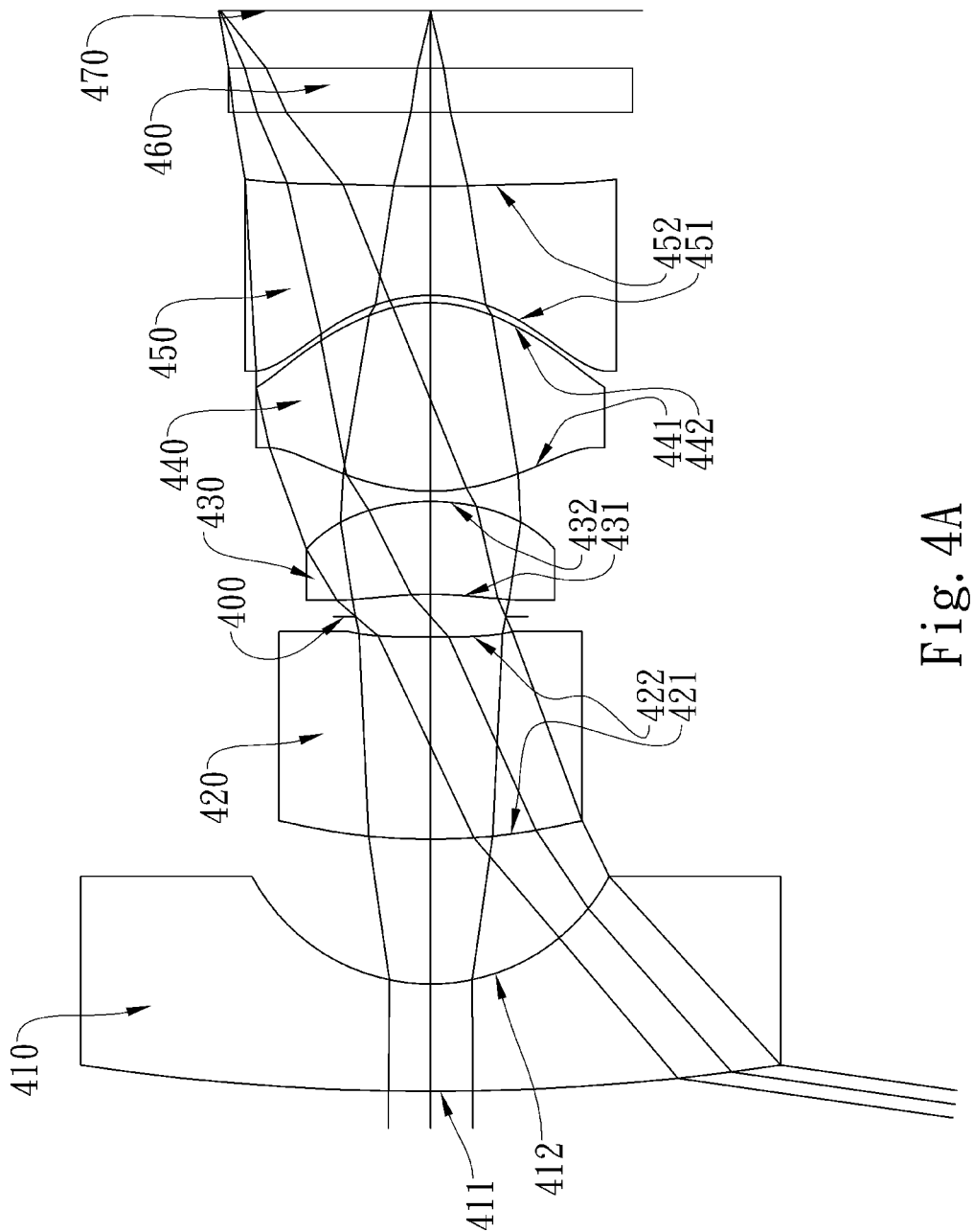
FIG. 4A shows a wide-viewing-angle imaging lens assembly in accordance with a fourth embodiment of the present invention.
Figure 4B:
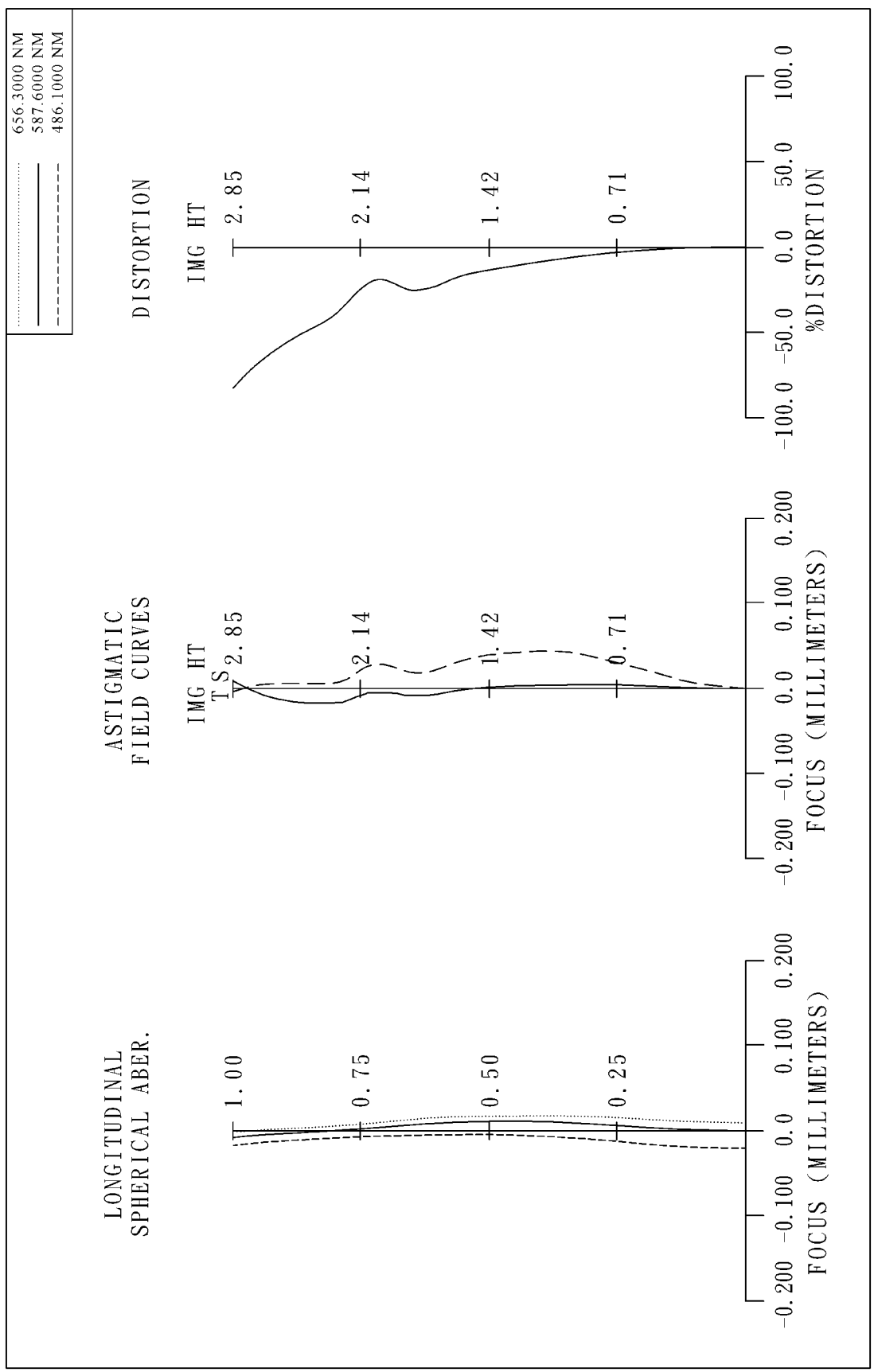
FIG. 4B shows the aberration curves of the fourth embodiment of the present invention.

FIG. 4A shows a wide-viewing-angle imaging lens assembly in accordance with a fourth embodiment of the present invention, and FIG. 4B shows the aberration curves of the fourth embodiment of the present invention. The wide-viewing-angle imaging lens assembly in the fourth embodiment mainly comprises five lens elements, in order from an object side to an image side: a front lens group, a stop 400, and a rear lens group. The front lens group comprises, in order from the object side to the image side: a glass first lens element 410 with negative refractive power having a convex object-side surface 411 and a concave image-side surface 412; and a plastic second lens element 420 with positive refractive power having a convex object-side surface 421 and a concave image-side surface 422, both of the surfaces 421 and 422 being aspheric. The rear lens group comprises, in order from the object side to the image side: a plastic third lens element 430 with positive refractive power having a concave object-side surface 431 and a convex image-side surface 432, wherein both of the surfaces 431 and 432 are aspheric, and the peripheral portion of the image-side surface 432 has a higher curvature than the central portion thereof does; a plastic fourth lens element 440 with positive refractive power having a convex object-side surface 441 and a convex image-side surface 442, both of the surfaces 441 and 442 being aspheric; and a plastic fifth lens element 450 with negative refractive power having a concave object-side surface 451 and a concave image-side surface 452, both of the surfaces 451 and 452 being aspheric. The stop 400 is disposed between the second lens element 420 and the third lens element 430. The wide-viewing-angle imaging lens assembly further comprises an IR filter 460 disposed between the image-side surface 452 of the fifth lens element 450 and an image plane 470; the IR filter 460 is made of glass and has no influence on the focal length of the wide-viewing-angle imaging lens assembly.

The equation of the aspheric surface profiles of the fourth embodiment has the same form as that of the first embodiment.

In the fourth embodiment of the present wide-viewing-angle imaging lens assembly, the focal length of the assembly is f, and it satisfies the relation: f=2.52 (mm).

In the fourth embodiment of the present wide-viewing-angle imaging lens assembly, the f-number of the assembly is Fno, and it satisfies the relation: Fno=2.20.

In the fourth embodiment of the present wide-viewing-angle imaging lens assembly, half of the maximum field of view of the assembly is HFOV, and it satisfies the relation: HFOV=81.8 (degrees).

In the fourth embodiment of the present wide-viewing-angle imaging lens assembly, the Abbe number of the first lens element 410 is V1, the Abbe number of the second lens element 420 is V2, and they satisfy the relation: V1−V2=31.3.

In the fourth embodiment of the present wide-viewing-angle imaging lens assembly, the focal length of the assembly is f, the focal length of the first lens element 410 is f1, and they satisfy the relation: f/f1=−0.60.

In the fourth embodiment of the present wide-viewing-angle imaging lens assembly, the focal length of the assembly is f, the focal length of the fourth lens element 440 is f4, and they satisfy the relation: f/f4=0.97.

In the fourth embodiment of the present wide-viewing-angle imaging lens assembly, the focal length of the first lens element 410 is f1, the focal length of the second lens element 420 is f2, and they satisfy the relation: |f1/f2|=0.26.

In the fourth embodiment of the present wide-viewing-angle imaging lens assembly, the radius of curvature of the image-side surface 432 of the third lens element 430 is R6, the radius of curvature of the object-side surface 431 of the third lens element 430 is R5, and they satisfy the relation: R6/R5=0.60.

In the fourth embodiment of the present wide-viewing-angle imaging lens assembly, the radius of curvature of the object-side surface 441 of the fourth lens element 440 is R7, the radius of curvature of the image-side surface 442 of the fourth lens element 440 is R8, and they satisfy the relation: R7/R8=−1.42.

In the fourth embodiment of the present wide-viewing-angle imaging lens assembly, the radius of curvature of the object-side surface 451 of the fifth lens element 450 is R9, the radius of curvature of the image-side surface 452 of the fifth lens element 450 is R10, and they satisfy the relation: R9/R10=−0.17.

In the fourth embodiment of the present wide-viewing-angle imaging lens assembly, the radius of curvature of the object-side surface 411 of the first lens element 410 is R1, the radius of curvature of the image-side surface 412 of the first lens element 410 is R2, and they satisfy the relation: (R1+R2)/(R1−R2)=1.19.

In the fourth embodiment of the present wide-viewing-angle imaging lens assembly, the distance on the optical axis between the second lens element 420 and the third lens element 430 is T23, the focal length of the assembly is f, and they satisfy the relation: T23/f=0.23.

In the fourth embodiment of the present wide-viewing-angle imaging lens assembly, an electronic sensor disposed at the image plane 470 is further provided for image formation of the object, half of the diagonal length of the effective pixel area of the electronic sensor is ImgH, the focal length of the assembly is f, and they satisfy the relation: ImgH/f=1.13.

In the fourth embodiment of the present wide-viewing-angle imaging lens assembly, the distance on the optical axis between the stop 400 and the electronic sensor is SL, the distance on the optical axis between the object-side surface 411 of the first lens element 410 and the electronic sensor is TTL, and they satisfy the relation: SL/TTL=0.55.

In the fourth embodiment of the present wide-viewing-angle imaging lens assembly, the distance on the optical axis between the object-side surface 411 of the first lens element 410 and the electronic sensor is TTL, half of the diagonal length of the effective pixel area of the electronic sensor is ImgH, and they satisfy the relation: TTL/ImgH=5.06.

The detailed optical data of the fourth embodiment is shown in FIG. 13 (TABLE 7), and the aspheric surface data is shown in FIG. 14 (TABLE 8), wherein the units of the radius of curvature, the thickness and the focal length are expressed in mm, and HFOV is half of the maximum field of view.

Figure 5A:
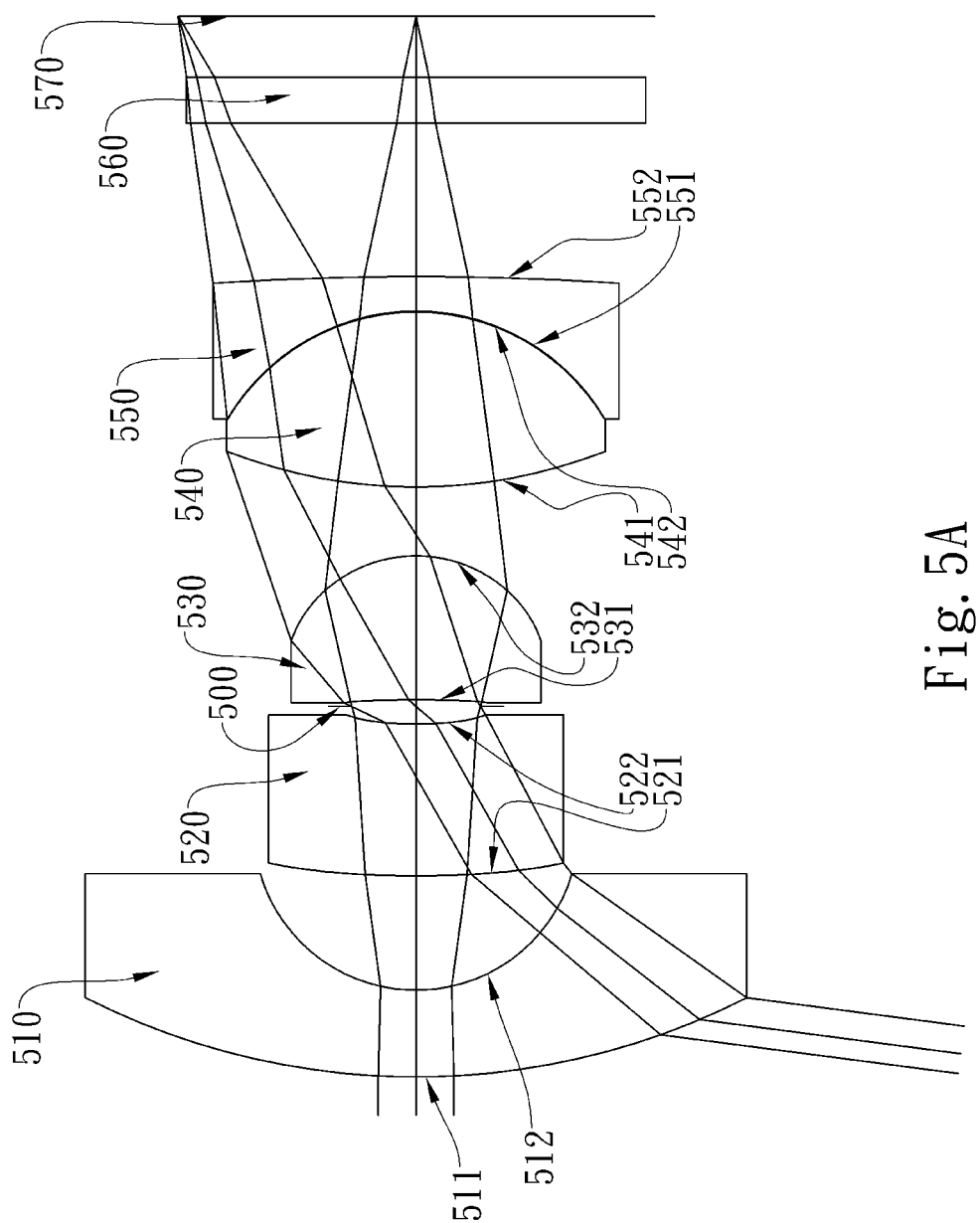
FIG. 5A shows a wide-viewing-angle imaging lens assembly in accordance with a fifth embodiment of the present invention.
Figure 5B:
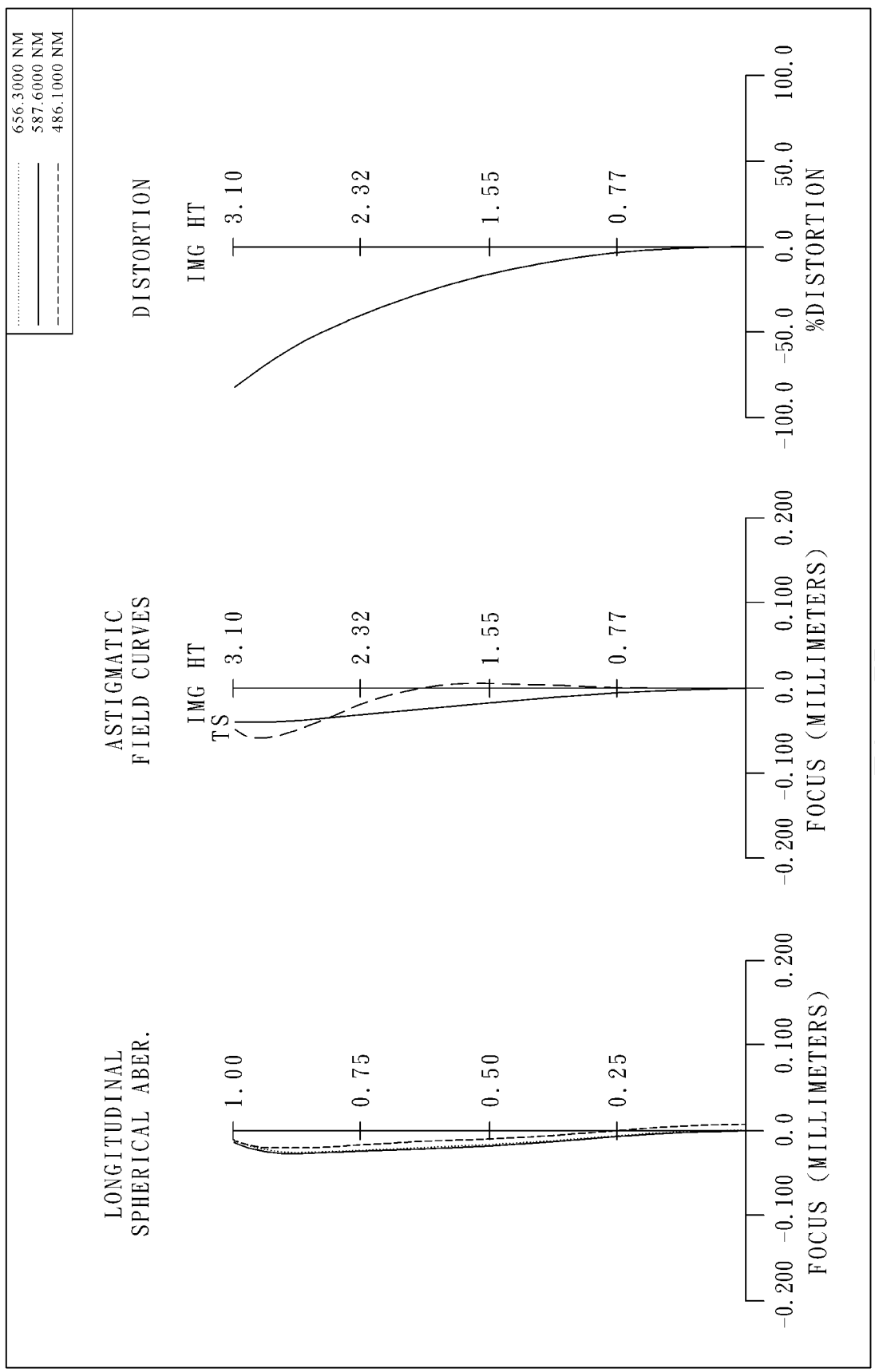
FIG. 5B shows the aberration curves of the fifth embodiment of the present invention.

FIG. 5A shows a wide-viewing-angle imaging lens assembly in accordance with a fifth embodiment of the present invention, and FIG. 5B shows the aberration curves of the fifth embodiment of the present invention. The wide-viewing-angle imaging lens assembly in the fifth embodiment mainly comprises five lens elements, in order from an object side to an image side: a front lens group, a stop 500, and a rear lens group. The front lens group comprises, in order from the object side to the image side: a glass first lens element 510 with negative refractive power having a convex object-side surface 511 and a concave image-side surface 512; and a plastic second lens element 520 with negative refractive power having a convex object-side surface 521 and a concave image-side surface 522, both of the surfaces 521 and 522 being aspheric. The rear lens group comprises, in order from the object side to the image side: a plastic third lens element 530 with positive refractive power having a concave object-side surface 531 and a convex image-side surface 532, wherein both of the surfaces 531 and 532 are aspheric, and the peripheral portion of the image-side surface 532 has a higher curvature than the central portion thereof does; a glass fourth lens element 540 with positive refractive power having a convex object-side surface 541 and a convex image-side surface 542; and a glass fifth lens element 550 with negative refractive power having a concave object-side surface 551 and a convex image-side surface 552, wherein the image-side surface 542 of the fourth lens element 540 and the object-side surface 551 of the fifth lens element 550 are attached together. The stop 500 is disposed between the second lens element 520 and the third lens element 530. The wide-viewing-angle imaging lens assembly further comprises an IR filter 560 disposed between the image-side surface 552 of the fifth lens element 550 and an image plane 570; the IR filter 560 is made of glass and has no influence on the focal length of the wide-viewing-angle imaging lens assembly.

The equation of the aspheric surface profiles of the fifth embodiment has the same form as that of the first embodiment.

In the fifth embodiment of the present wide-viewing-angle imaging lens assembly, the focal length of the assembly is f, and it satisfies the relation: f=2.36 (mm).

In the fifth embodiment of the present wide-viewing-angle imaging lens assembly, the f-number of the assembly is Fno, and it satisfies the relation: Fno=2.40.

In the fifth embodiment of the present wide-viewing-angle imaging lens assembly, half of the maximum field of view of the assembly is HFOV, and it satisfies the relation: HFOV=82.6 (degrees).

In the fifth embodiment of the present wide-viewing-angle imaging lens assembly, the Abbe number of the first lens element 510 is V1, the Abbe number of the second lens element 520 is V2, and they satisfy the relation: V1−V2=26.2.

In the fifth embodiment of the present wide-viewing-angle imaging lens assembly, the focal length of the assembly is f, the focal length of the first lens element 510 is f1, and they satisfy the relation: f/f1=−0.62.

In the fifth embodiment of the present wide-viewing-angle imaging lens assembly, the focal length of the assembly is f, the focal length of the fourth lens element 540 is f4, and they satisfy the relation: f/f4=0.77.

In the fifth embodiment of the present wide-viewing-angle imaging lens assembly, the focal length of the first lens element 510 is f1, the focal length of the second lens element 520 is f2, and they satisfy the relation: |f1/f2|=0.30.

In the fifth embodiment of the present wide-viewing-angle imaging lens assembly, the radius of curvature of the image-side surface 532 of the third lens element 530 is R6, the radius of curvature of the object-side surface 531 of the third lens element 530 is R5, and they satisfy the relation: R6/R5=0.08.

In the fifth embodiment of the present wide-viewing-angle imaging lens assembly, the radius of curvature of the object-side surface 541 of the fourth lens element 540 is R7, the radius of curvature of the image-side surface 542 of the fourth lens element 540 is R8, and they satisfy the relation: R7/R8=−2.38.

In the fifth embodiment of the present wide-viewing-angle imaging lens assembly, the radius of curvature of the object-side surface 551 of the fifth lens element 550 is R9, the radius of curvature of the image-side surface 552 of the fifth lens element 550 is R10, and they satisfy the relation: R9/R10=0.07.

In the fifth embodiment of the present wide-viewing-angle imaging lens assembly, the radius of curvature of the object-side surface 511 of the first lens element 510 is R1, the radius of curvature of the image-side surface 512 of the first lens element 510 is R2, and they satisfy the relation: (R1+R2)/(R1−R2)=1.57.

In the fifth embodiment of the present wide-viewing-angle imaging lens assembly, the distance on the optical axis between the second lens element 520 and the third lens element 530 is T23, the focal length of the assembly is f, and they satisfy the relation: T23/f=0.13.

In the fifth embodiment of the present wide-viewing-angle imaging lens assembly, an electronic sensor disposed at the image plane 570 is further provided for image formation of the object, half of the diagonal length of the effective pixel area of the electronic sensor is ImgH, the focal length of the assembly is f, and they satisfy the relation: ImgH/f=1.31.

In the fifth embodiment of the present wide-viewing-angle imaging lens assembly, the distance on the optical axis between the stop 500 and the electronic sensor is SL, the distance on the optical axis between the object-side surface 511 of the first lens element 510 and the electronic sensor is TTL, and they satisfy the relation: SL/TTL=0.65.

In the fifth embodiment of the present wide-viewing-angle imaging lens assembly, the distance on the optical axis between the object-side surface 511 of the first lens element 510 and the electronic sensor is TTL, half of the diagonal length of the effective pixel area of the electronic sensor is ImgH, and they satisfy the relation: TTL/ImgH=4.40.

The detailed optical data of the fifth embodiment is shown in FIG. 15 (TABLE 9), and the aspheric surface data is shown in FIG. 16 (TABLE 10), wherein the units of the radius of curvature, the thickness and the focal length are expressed in mm, and HFOV is half of the maximum field of view.

Figure 6A:
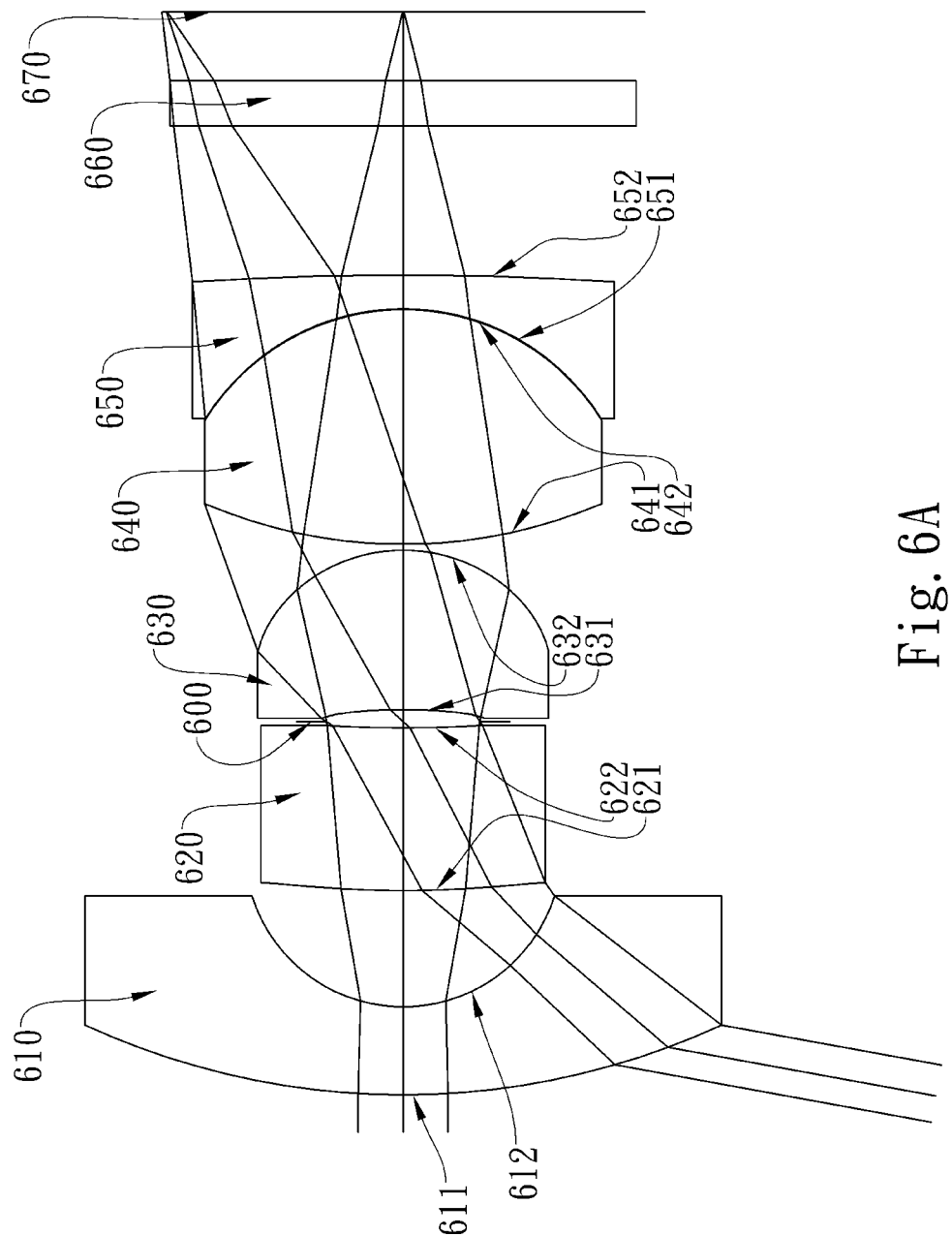
FIG. 6A shows a wide-viewing-angle imaging lens assembly in accordance with a sixth embodiment of the present invention.
Figure 6B:
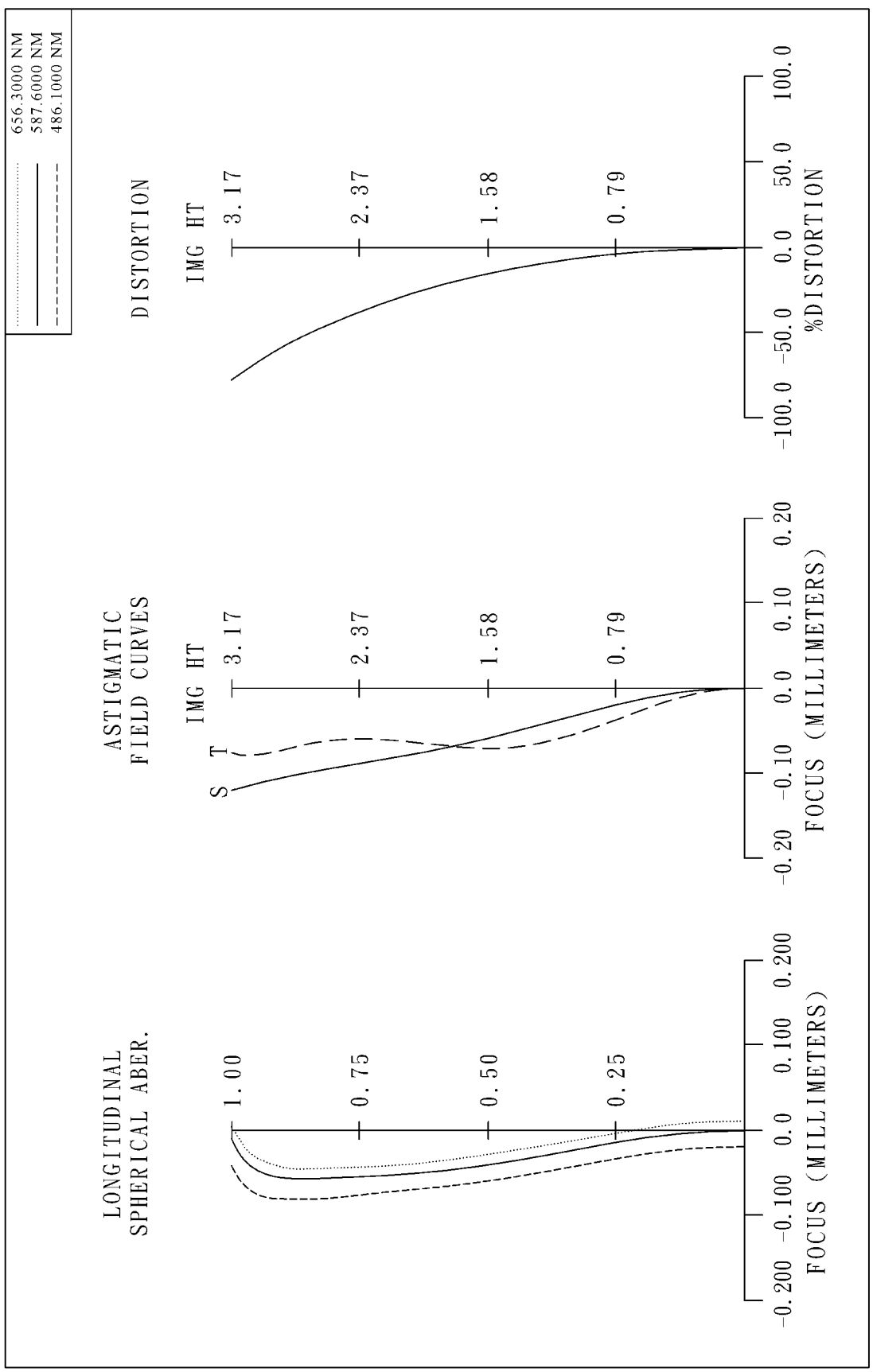
FIG. 6B shows the aberration curves of the sixth embodiment of the present invention.

FIG. 6A shows a wide-viewing-angle imaging lens assembly in accordance with a sixth embodiment of the present invention, and FIG. 6B shows the aberration curves of the sixth embodiment of the present invention. The wide-viewing-angle imaging lens assembly in the sixth embodiment mainly comprises five lens elements, in order from an object side to an image side: a front lens group, a stop 600, and a rear lens group. The front lens group comprises, in order from the object side to the image side: a glass first lens element 610 with negative refractive power having a convex object-side surface 611 and a concave image-side surface 612; and a plastic second lens element 620 with positive refractive power having a convex object-side surface 621 and a concave image-side surface 622, both of the surfaces 621 and 622 being aspheric. The rear lens group comprises, in order from the object side to the image side: a plastic third lens element 630 with positive refractive power having a concave object-side surface 631 and a convex image-side surface 632, wherein both of the surfaces 631 and 632 are aspheric, and the peripheral portion of the image-side surface 632 has a higher curvature than the central portion thereof does; a glass fourth lens element 640 with positive refractive power having a convex object-side surface 641 and a convex image-side surface 642; and a glass fifth lens element 650 with negative refractive power having a concave object-side surface 651 and a convex image-side surface 652, wherein the image-side surface 642 of the fourth lens element 640 and the object-side surface 651 of the fifth lens element 650 are attached together. The stop 600 is disposed between the second lens element 620 and the third lens element 630. The wide-viewing-angle imaging lens assembly further comprises an IR filter 660 disposed between the image-side surface 652 of the fifth lens element 650 and an image plane 670; the IR filter 660 is made of glass and has no influence on the focal length of the wide-viewing-angle imaging lens assembly.

The equation of the aspheric surface profiles of the sixth embodiment has the same form as that of the first embodiment.

In the sixth embodiment of the present wide-viewing-angle imaging lens assembly, the focal length of the assembly is f, and it satisfies the relation: f=2.53 (mm).

In the sixth embodiment of the present wide-viewing-angle imaging lens assembly, the f-number of the assembly is Fno, and it satisfies the relation: Fno=2.10.

In the sixth embodiment of the present wide-viewing-angle imaging lens assembly, half of the maximum field of view of the assembly is HFOV, and it satisfies the relation: HFOV=79.7 (degrees).

In the sixth embodiment of the present wide-viewing-angle imaging lens assembly, the Abbe number of the first lens element 610 is V1, the Abbe number of the second lens element 620 is V2, and they satisfy the relation: V1−V2=26.2.

In the sixth embodiment of the present wide-viewing-angle imaging lens assembly, the focal length of the assembly is f, the focal length of the first lens element 610 is f1, and they satisfy the relation: f/f1=−0.68.

In the sixth embodiment of the present wide-viewing-angle imaging lens assembly, the focal length of the assembly is f, the focal length of the fourth lens element 640 is f4, and they satisfy the relation: f/f4=0.75.

In the sixth embodiment of the present wide-viewing-angle imaging lens assembly, the focal length of the first lens element 610 is f1, the focal length of the second lens element 620 is f2, and they satisfy the relation: |f1/f2|=0.07.

In the sixth embodiment of the present wide-viewing-angle imaging lens assembly, the radius of curvature of the image-side surface 632 of the third lens element 630 is R6, the radius of curvature of the object-side surface 631 of the third lens element 630 is R5, and they satisfy the relation: R6/R5=0.26.

In the sixth embodiment of the present wide-viewing-angle imaging lens assembly, the radius of curvature of the object-side surface 641 of the fourth lens element 640 is R7, the radius of curvature of the image-side surface 642 of the fourth lens element 640 is R8, and they satisfy the relation: R7/R8=−2.17.

In the sixth embodiment of the present wide-viewing-angle imaging lens assembly, the radius of curvature of the object-side surface 651 of the fifth lens element 650 is R9, the radius of curvature of the image-side surface 652 of the fifth lens element 650 is R10, and they satisfy the relation: R9/R10=0.07.

In the sixth embodiment of the present wide-viewing-angle imaging lens assembly, the radius of curvature of the object-side surface 611 of the first lens element 610 is R1, the radius of curvature of the image-side surface 612 of the first lens element 610 is R2, and they satisfy the relation: (R1+R2)/(R1−R2)=1.53.

In the sixth embodiment of the present wide-viewing-angle imaging lens assembly, the distance on the optical axis between the second lens element 620 and the third lens element 630 is T23, the focal length of the assembly is f, and they satisfy the relation: T23/f=0.10.

In the sixth embodiment of the present wide-viewing-angle imaging lens assembly, an electronic sensor disposed at the image plane 670 is further provided for image formation of the object, half of the diagonal length of the effective pixel area of the electronic sensor is ImgH, the focal length of the assembly is f, and they satisfy the relation: ImgH/f=1.25.

In the sixth embodiment of the present wide-viewing-angle imaging lens assembly, the distance on the optical axis between the stop 600 and the electronic sensor is SL, the distance on the optical axis between the object-side surface 611 of the first lens element 610 and the electronic sensor is TTL, and they satisfy the relation: SL/TTL=0.65.

In the sixth embodiment of the present wide-viewing-angle imaging lens assembly, the distance on the optical axis between the object-side surface 611 of the first lens element 610 and the electronic sensor is TTL, half of the diagonal length of the effective pixel area of the electronic sensor is ImgH, and they satisfy the relation: TTL/ImgH=4.51.

The detailed optical data of the sixth embodiment is shown in FIG. 17 (TABLE 11), and the aspheric surface data is shown in FIG. 18 (TABLE 12), wherein the units of the radius of curvature, the thickness and the focal length are expressed in mm, and HFOV is half of the maximum field of view.

It is to be noted that TABLES 1-12 (illustrated in FIGS. 7-18 respectively) show different data of the different embodiments; however, the data of the different embodiments are obtained from experiments. Therefore, any wide-viewing-angle imaging lens assembly of the same structure is considered to be within the scope of the present invention even if it uses different data. The preferred embodiments depicted above are exemplary and are not intended to limit the scope of the present invention. TABLE 13 (illustrated in FIG. 19) shows the data of the respective embodiments resulting from the equations.

What is claimed is:

1. A wide-viewing-angle imaging lens assembly comprising, in order from an object side to an image side: a front lens group, a stop, and a rear lens group,
    wherein the front lens group comprises, in order from the object side to the image side:
    a first lens element with negative refractive power having a concave image-side surface, and
    a second lens element;
    wherein the rear lens group comprises, in order from the object side to the image side:
    a third lens element with positive refractive power having a concave object-side surface and a convex image-side surface,
    a fourth lens element with positive refractive power having a convex object-side surface and a convex image-side surface, and
    a fifth lens element with negative refractive power having a concave object-side surface,
    wherein the number of lens elements with refractive power does not exceed six;
    wherein the assembly is further provided with an electronic sensor disposed at an image plane for image formation of the object; and
    wherein the lens element with refractive power which is closest to an object is the first lens element, a focal length of the assembly is f, a focal length of the first lens element is f1, a focal length of the second lens element is f2, a focal length of the fourth lens element is f4, a distance on an optical axis between the second lens element and the third lens element is T23, a radius of curvature of the object-side surface of the fourth lens element is R7, a radius of curvature of the image-side surface of the fourth lens element is R8, half of a diagonal length of an effective pixel area of the electronic sensor is ImgH, and they satisfy the following relations:

$-0.78 < f/f1 < -0.25;$ $0.50 < f/f4 < 1.00;$ $|f1/f2| < 0.60;$ $0.02 < T23/f < 0.68;$ $-3.50 < R7/R8 < -0.50;$ and $0.93 < ImgH/f < 2.30.$ 2. The wide-viewing-angle imaging lens assembly according to claim 1, wherein the second lens element has a convex object-side surface.

3. The wide-viewing-angle imaging lens assembly according to claim 1, wherein a radius of curvature of the object-side surface of the first lens element is R1, a radius of curvature of the image-side surface of the first lens element is R2, and they satisfy the following relation:

$1.07 < (R1+R2)/(R1-R2) < 2.50.$

4. The wide-viewing-angle imaging lens assembly according to claim 1, wherein the radius of curvature of the object-side surface of the fourth lens element is R7, the radius of curvature of the image-side surface of the fourth lens element is R8, and they satisfy the following relation:

$-2.80 < R7/R8 < -1.20.$

5. The wide-viewing-angle imaging lens assembly according to claim 1, wherein an Abbe number of the first lens element is V1, an Abbe number of the second lens element is V2, and they satisfy the following relation:

$20.0 < V1-V2 < 42.0.$

6. The wide-viewing-angle imaging lens assembly according to claim 1, wherein a peripheral portion of the image-side surface of the third lens element has a higher curvature than a central portion thereof does, and the assembly comprises at least two lens elements having aspheric surfaces.

7. The wide-viewing-angle imaging lens assembly according to claim 6, wherein a radius of curvature of the image-side surface of the third lens element is R6, a radius of curvature of the object-side surface of the third lens element is R5, and they satisfy the following relation:

$0.05 < R6/R5 < 0.75.$

8. The wide-viewing-angle imaging lens assembly according to claim 7, wherein a distance on the optical axis between the stop and the electronic sensor is SL, a distance on the optical axis between the object-side surface of the first lens element and the electronic sensor is TTL, and they satisfy the following relation:

$0.50<SL/TTL<0.78.$

9. The wide-viewing-angle imaging lens assembly according to claim 1, wherein half of the diagonal length of the effective pixel area of the electronic sensor is ImgH, the focal length of the assembly is f, and they satisfy the following relation:

$1.05<ImgH/f<1.70.$

10. The wide-viewing-angle imaging lens assembly according to claim 1, wherein the second lens element has positive refractive power, and the assembly comprises at least two lens elements having aspheric surfaces.

11. The wide-viewing-angle imaging lens assembly according to claim 1, wherein a distance on the optical axis between the object-side surface of the first lens element and the electronic sensor is TTL, half of a diagonal length of an effective pixel area of the electronic sensor is ImgH, and they satisfy the following relation:

$TTL/ImgH<5.2.$

12. A wide-viewing-angle imaging lens assembly comprising, in order from an object side to an image side:
  a first lens element with negative refractive power having a convex object-side surface and a concave image-side surface;
  a second lens element;
  a third lens element with positive refractive power having a convex image-side surface;
  a fourth lens element with positive refractive power having a convex object-side surface and a convex image-side surface; and
  a fifth lens element with negative refractive power having a concave object-side surface,
  wherein there are five lens elements with refractive power in the wide-viewing-angle imaging lens assembly; and
  wherein the assembly is further provided with an electronic sensor disposed at an image plane for image formation of an object, a focal length of the assembly is f, a focal length of the first lens element is f1, a focal length of the second lens element is f2, a distance on an optical axis between the second lens element and the third lens element is T23, half of a diagonal length of an effective pixel area of the electronic sensor is ImgH, a radius of curvature of the image-side surface of the third lens element is R6, a radius of curvature of an object-side surface of the third lens element is R5, and they satisfy the following relations:

$-0.78<f/f1<-0.25;$ $|f1/f2|<0.60;$ $0.02<T23/f<0.68;$ $0.93<ImgH/f<2.30;$ and $0.05<R6/R5<0.75.$ 13. The wide-viewing-angle imaging lens assembly according to claim 12, wherein the second lens element has positive refractive power with a convex object-side surface, and the assembly comprises at least two lens elements having aspheric surfaces.

14. The wide-viewing-angle imaging lens assembly according to claim 12, wherein the assembly is further provided with a stop disposed between the second lens element and the third lens element, a distance on the optical axis between the stop and the electronic sensor is SL, a distance on the optical axis between the object-side surface of the first lens element and the electronic sensor is TTL, and they satisfy the following relation:

$0.50<SL/TTL<0.78.$

15. The wide-viewing-angle imaging lens assembly according to claim 12, wherein a radius of curvature of the object-side surface of the first lens element is R1, a radius of curvature of the image-side surface of the first lens element is R2, and they satisfy the following relation:

$1.07<(R1+R2)/(R1-R2)<2.50.$

16. The wide-viewing-angle imaging lens assembly according to claim 15, wherein half of the diagonal length of the effective pixel area of the electronic sensor is ImgH, the focal length of the assembly is f, and they satisfy the following relation:

$1.05<ImgH/f<1.70.$

17. The wide-viewing-angle imaging lens assembly according to claim 15, wherein a radius of curvature of the object-side surface of the fifth lens element is R9, a radius of curvature of the image-side surface of the fifth lens element is R10, and they satisfy the following relation:

$-0.30<R9/R10<0.30.$

18. A wide-viewing-angle imaging lens assembly comprising, in order from an object side to an image side:
  a first lens element with negative refractive power having a convex object-side surface and a concave image-side surface;
  a second lens element;
  a third lens element with positive refractive power having a convex image-side surface;
  a fourth lens element with positive refractive power having a convex object-side surface and a convex image-side surface; and
  a fifth lens element with negative refractive power having a concave object-side surface,
  wherein there are five lens elements with refractive power in the wide-viewing-angle imaging lens assembly;
  wherein a peripheral portion of the image-side surface of the third lens element has a higher curvature than a central portion thereof does, and the assembly comprising at least two lens elements having aspheric surfaces; and
  wherein a focal length of the first lens element is f1, a focal length of the second lens element is f2, a radius of curvature of the image-side surface of the third lens element is R6, a radius of curvature of the object-side surface of the third lens element is R5 and they satisfy the following relations:

$|f1/f2|<0.60;$ and $0.05<R6/R5<0.75.$

19. The wide-viewing-angle imaging lens assembly according to claim 18, wherein a focal length of the assembly is f, the focal length of the first lens element is f1, and they satisfy the following relation:

$-0.78<f/f1<-0.25.$

20. The wide-viewing-angle imaging lens assembly according to claim 18, wherein the second element has positive refractive power.

* * * * *

UNITED STATES PATENT AND TRADEMARK OFFICE
CERTIFICATE OF CORRECTION

PATENT NO.        : 8,743,485 B2                              Page 1 of 1
APPLICATION NO.   : 12/912460
DATED             : June 3, 2014
INVENTOR(S)       : Dung Yi Hsieh It is certified that error appears in the above-identified patent and that said Letters Patent is hereby corrected as shown below:

Title Page, Item 73, line 3: "Largen Precision Co., Ltd." should read -- Largan Precision Co., Ltd. --.

Signed and Sealed this
Twenty-third Day of December, 2014

Michelle K. Lee
*Deputy Director of the United States Patent and Trademark Office*